(12) United States Patent
Job et al.

(10) Patent No.: US 12,511,593 B2
(45) Date of Patent: Dec. 30, 2025

(54) BUSINESS INTELLIGENCE SOCIALIZATION PLATFORM AND METHODS OF USING THE SAME

(71) Applicant: IXIS, LLC, Burlington, VT (US)

(72) Inventors: Danielle Giandomenico Job, South Burlington, VT (US); Kurt Ryan Peters, Little Compton, RI (US); Scott Cohen, Rosemere (CA); Filipe Rodrigues, Shelburne, VT (US); Princewill Ehiriudu, Leander, TX (US)

(73) Assignee: IXIS, LLC, Burlington, VT (US)

( * ) Notice: Subject to any disclaimer, the term of this patent is extended or adjusted under 35 U.S.C. 154(b) by 0 days.

(21) Appl. No.: 19/072,927

(22) Filed: Mar. 6, 2025

(65) Prior Publication Data

US 2025/0322325 A1 Oct. 16, 2025

Related U.S. Application Data

(63) Continuation of application No. PCT/US2023/030616, filed on Aug. 18, 2023.

(60) Provisional application No. 63/404,405, filed on Sep. 7, 2022.

(51) Int. Cl.
| | |
|---|---|
| *G06Q 10/063* | (2023.01) |
| *G06F 16/2457* | (2019.01) |
| *G06N 5/022* | (2023.01) |
| *G06Q 10/0637* | (2023.01) |
| *G06Q 10/0639* | (2023.01) |

(52) U.S. Cl.
CPC ..... *G06Q 10/063* (2013.01); *G06F 16/24575* (2019.01); *G06N 5/022* (2013.01); *G06Q 10/0637* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 8,819,564 B1 * | 8/2014 | Heath | G06Q 10/103 235/386 |
| 10,963,468 B1 * | 3/2021 | Molina | H04L 51/52 |
| 11,151,232 B2 * | 10/2021 | Machani | G06F 21/552 |
| 11,263,562 B1 * | 3/2022 | Hankins | G06Q 10/06 |

(Continued)

OTHER PUBLICATIONS

International Search Report and Written Opinion dated Jan. 3, 2024 in connection with PCT/US2023/030616 filed Aug. 18, 2023.

*Primary Examiner* — Jamie R Kucab
(74) *Attorney, Agent, or Firm* — Downs Rachlin Martin PLLC

(57) ABSTRACT

The present disclosure describes platforms and systems designed and configured as a collaboration portal that functions as a socialization and interpretation "layer" that is configured to be added to a modern BI or data technology stack to extract its full value. Collaboration portals designed and configured according to the present disclosure may be configured to address the problem of underutilized BI resources by providing technical solutions for aggregating and socializing insights across existing BI tools and across organizational divisions, for example, collaborating, discussing, sharing, socializing, etc. a plurality of insights generated on a plurality of disparate BI tools or other software programs via a central collaboration portal with a plurality of users.

25 Claims, 25 Drawing Sheets

(56) References Cited

U.S. PATENT DOCUMENTS

2014/0201231 A1\* 7/2014 Smith ................... G06F 16/951
  707/769
2017/0024674 A1\* 1/2017 Lerena ............. G06Q 10/06313

\* cited by examiner

1230

Add Insight

Headline*

[Total donations up 32% YoY]

Insight

[Growth is primarily due to SF IoT]

Tags

[Add tag and press return]

[donations⊗]

1231

☐ Add to Story

[Cancel] [Next]

---

Add Insight  1236

Start Date | End Date
[08/17/2023] [08/17/2023]
Add the dates of the insight

Source  ←1232
[Tableau]

URL ←1234
[https://prod-useast-a.online.tableau.com/t/ixistableauclo]

YTD Dec-21 compared to YTD Dec-20
How much donations do we receive?

Δ1,547K  Salesforce IoT  $953,327  71%
Total    Website         $132,596  10%
Donations Event          $97,563   7%
         Other           $91,466   7%
+32.4% vs Social Media   $75,789   6%
YTD Dec-20

3,318                    ▽ $466
Nb of Gifts              Avg Gift

+76.6% vs YTD Dec-20     -25.0% vs YTD Dec-20

⊕ Add Image

[Back]                   [Cancel] [Save]

FIG. 16

Relationship of FIGS. 18A -18D

FIG. 20

BUSINESS INTELLIGENCE SOCIALIZATION PLATFORM AND METHODS OF USING THE SAME

RELATED APPLICATIONS

This application is a U.S. bypass continuation patent application of PCT Application No. PCT/US2023/030616, filed on Aug. 18, 2023, and entitled "Business Intelligence Socialization Platform and Methods of Using the Same," which application claims the benefit of priority of U.S. Provisional Application No. 63/404,405, filed Sep. 7, 2022, entitled "Business Intelligence Socialization Platform and Methods of Using the Same." Each application is incorporated by reference herein in its entirety.

FIELD

The present disclosure generally relates to software-implemented business intelligence and data science tools and more specifically to business intelligence socialization platforms and methods of using the same.

BACKGROUND

Business Intelligence (BI) is traditionally focused on summarizing data into key performance indicators (KPIs) and generating tabular/visual reporting (data visualizations). Data science (DS) overlaps and also has a focus on predictive analytics and optimization. As the BI/DS industry matures, the amount of available data and corresponding analyses has grown, but organizations are not extracting the full potential of the data and analytics, at least in part because of technical challenges in processing and absorbing the ever-growing volume of data and analytics produced by available BI tools. Technical solutions are needed to extract full value from the BI/DS stacks, in which many companies have invested significant resources.

As a result of the traditional focus of BI tools on KPI creation and visual reporting (data visualizations) one challenge to be overcome is that the interpretation of the visualizations is typically left to individual users and thus may result in different conclusions being drawn by different members of the same organization leading to inconsistencies in interpretation and added costs and delays for rationalization efforts.

A further impediment to increased realization of potential opportunities enabled by current BI tools arises in many organizations because there is a limited number of subject matter experts that can analyze data and provide context on what the data is telling the organization. This is often accomplished via point-to-point email exchanges today, creating multiple requests to the subject matter experts for the same topic or loss of the outcome if one or more participants leave the organization.

There thus remains needs in the art for solutions to provide mechanisms for stakeholders to request information from the subject matter experts in efficient and consistent structures across organizations. There is also a need for platforms to effectively permit subject matter experts to share data visualizations and interpretations generated with disparate third-party BI tools back with originating stakeholders and as well as any other stakeholders that may have similar data interpretation needs.

SUMMARY

In one implementation, the present disclosure is directed to a computer-implemented system, which includes one or more processing systems communicating with non-transient data store and stored instructions configured to be executed by the one or more processors, wherein the instructions when executed by the one or more processing systems cause the processing systems to generate a business intelligence (BI) socialization platform, comprising: a user interface configured on a client system providing a collaboration portal; plural frameworks accessible by users through the collaboration portal, the frameworks configure capture data visualizations from BI tools, generate insights based on the captured data visualizations, share generated insights among authorized stakeholders, and persist the generated insights for later reference by stakeholders within the platform; and integration of one or more BI tools such that outputs of the BI tools are accessible to users within the plural frameworks.

In another implementation, the present disclosure is directed to a computer-implemented method for business intelligence (BI) socialization. The method includes configuring a collaboration portal on a client computing system including a user interface; integrating into the collaboration portal on the client computing system a plurality of BI tools; configuring within the collaboration portal on the client computing system a plurality of frameworks accessible by authenticated users of the client computing system, the frameworks configured to capture data visualizations from BI tools, generate insights based on the captured data visualizations, share generated insights among authorized stakeholders, and persist the generated insights for later reference by stakeholders within the platform; communicating across a computer-controlled network with one or more configured client computer systems and one or more integrated BI tools; presenting data visualization outputs of the one or more integrated BI tools into the collaboration portal; configuring at least one the framework accessible by an authenticated user through the collaboration portal to create insights, wherein the insight framework presents user manipulable virtual tools within the platform user interface on the client system, the tools configured to select, capture and annotate data visualization outputs of integrated BI tools as the insights and to persist the insights; and displaying persisted insights to authorized stakeholders within the collaboration portal.

In yet another implementation, the present disclosure is directed to a system that includes a collaboration portal for aggregation and socialization of business intelligence; and a data store; wherein the collaboration portal is communicatively coupled to: a plurality of data visualization solutions that generate data visualizations of business intelligence information; and one or more notification systems; a processor; and a non-transitory computer readable storage medium containing instructions for: displaying an insight integration and collaboration user interface (UI); displaying at least one insight creation user control element for selecting a data visualization generated by any of the plurality of data visualization solutions; displaying, on the UI, a data visualization in response to a user selection of the data visualization by the at least one insight creation user control element; receiving, via the at least one insight creation user control element, user annotations to the selected data visualization; storing, in the data store, the selected data visualization and user annotations as an insight; and receiving, via the UI, user selections for sharing the insight with one or more users.

BRIEF DESCRIPTION OF DRAWINGS

For the purpose of illustrating the disclosure, the drawings show aspects of one or more embodiments of the disclosure.

However, it should be understood that the present disclosure is not limited to the precise arrangements and instrumentalities shown in the drawings, wherein:

FIG. 16 is a screenshot showing an example of an insight from external files user interface window according to an embodiment of the present disclosure.

Figure 18A:
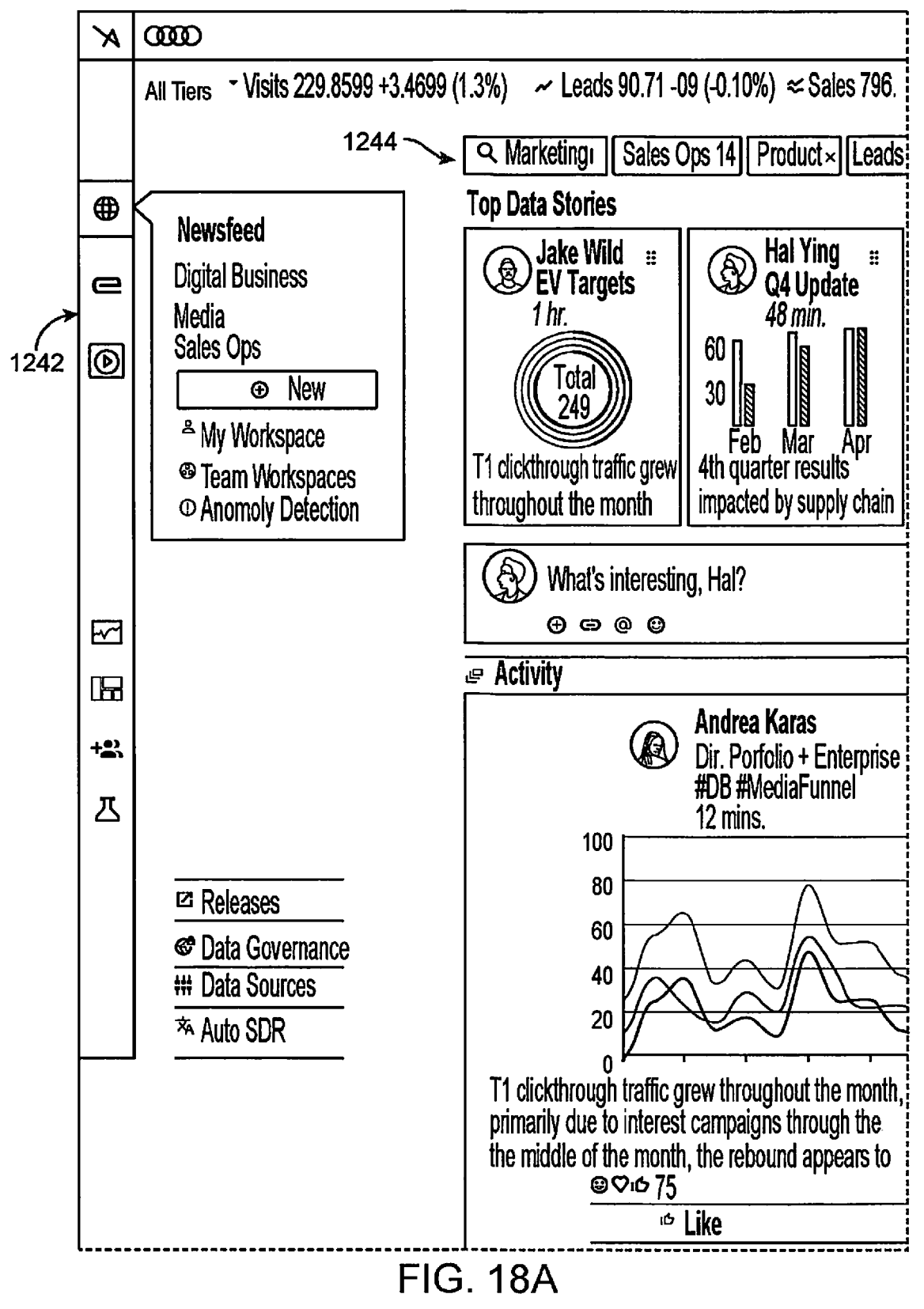
Figure 18B:
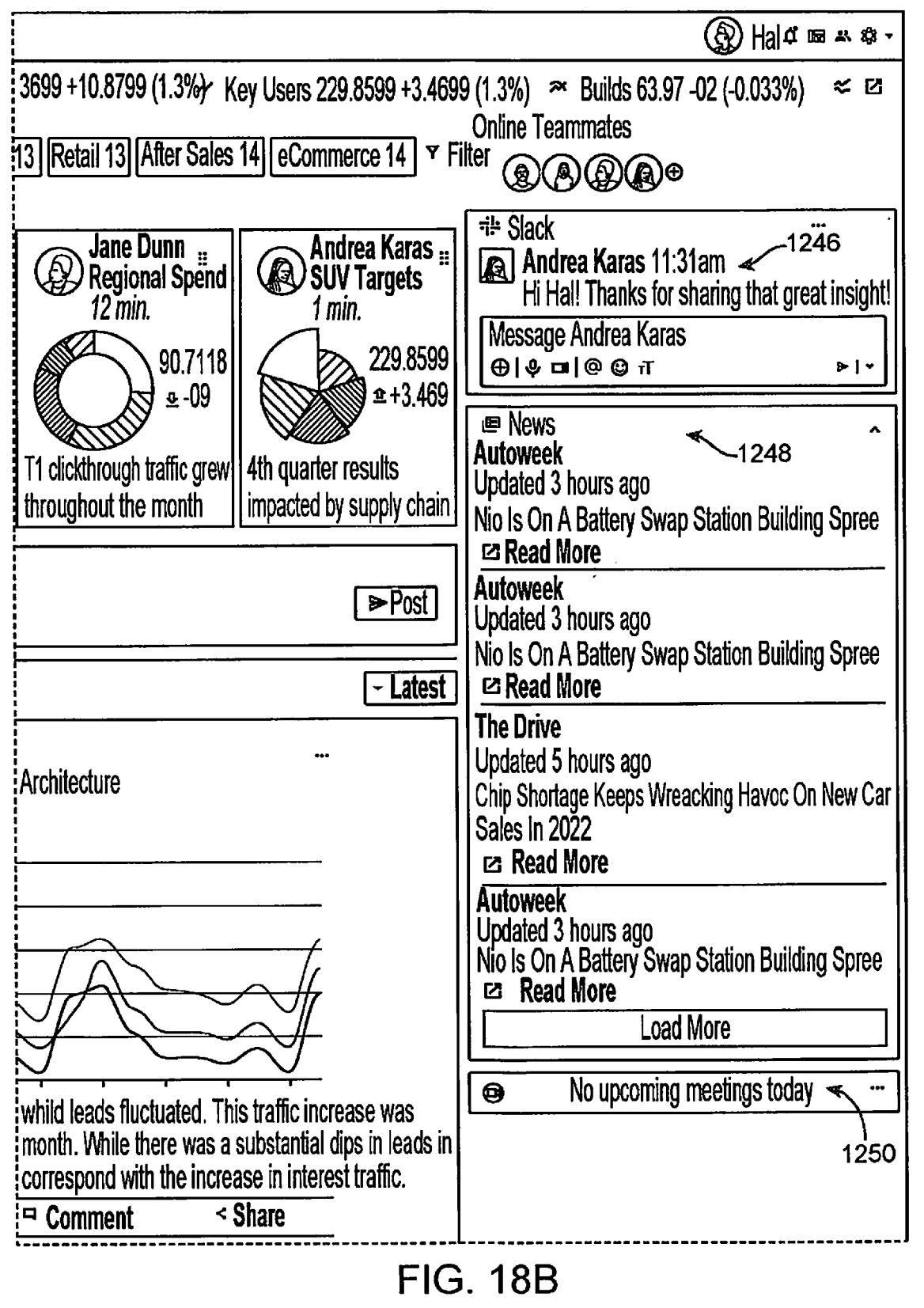

FIG. 18 is a key showing the relative arrangement of FIGS. 18A, 18B, 18C and 18D, which together present a screenshot showing an example of one half of a newsfeed collaboration portal user interface window according to an embodiment of the present disclosure, wherein FIG. 18A shows the upper left portion of the user interface window, FIG. 18B shows the upper right portion of the user interface window.

Figure 19:
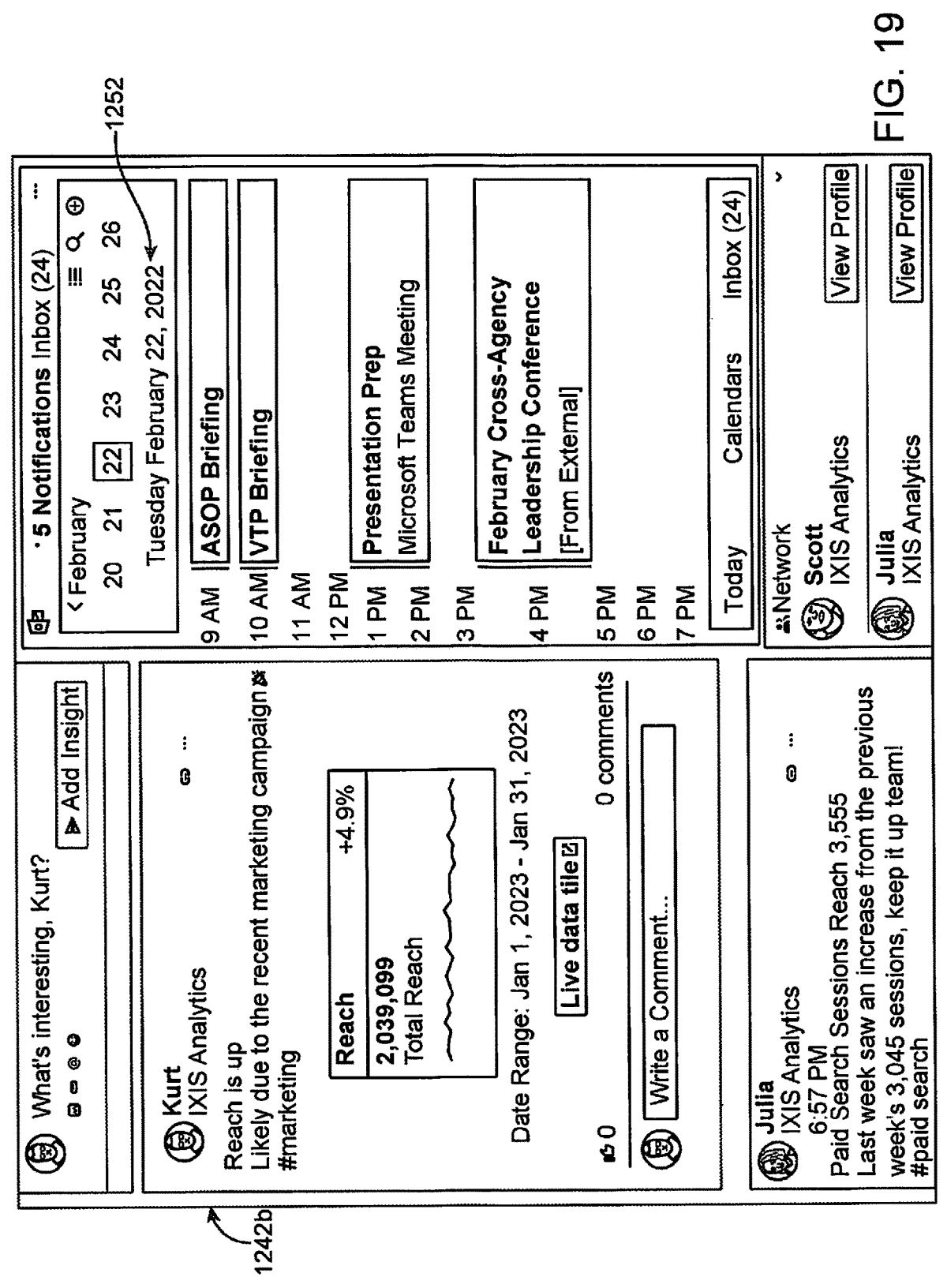

FIG. 19 is a screenshot showing a second half of the user interface window of FIG. 17.

FIG. 20 is a screenshot showing an example of a story edit mode user interface window according to an embodiment of the present disclosure.

DETAILED DESCRIPTION

The reader is directed to the glossary at the end of the specification for guidance on the meaning of certain terms used herein.

The present disclosure describes embodiments of platforms, systems and methods allowing for interaction between a company's biggest assets—its employees' subject matter expertise and its data—in a frictionless and enjoyable way. The present disclosure includes systems designed and configured as a collaboration portal that functions as an interpretation "layer" that is configured to be added to a modern BI/DS stack. As is known in the art, BI/DS activities are primarily focused on data summarization (analysis, modeling) and narrative output, aiming to minimize "time to insight". Platforms providing collaboration portals designed and configured according to the present disclosure may be configured to address the problem of underutilized BI/DS resources by providing technical solutions for aggregating and socializing insights across existing BI/DS tools and across organizational divisions, aiming to minimize "time to conversation," for example, collaborating, discussing, identifying, sharing, socializing, etc., a plurality of insights generated on a plurality of disparate BI tools, DS tools, or other software programs via a central collaboration portal with a plurality of users.

Figure 1:
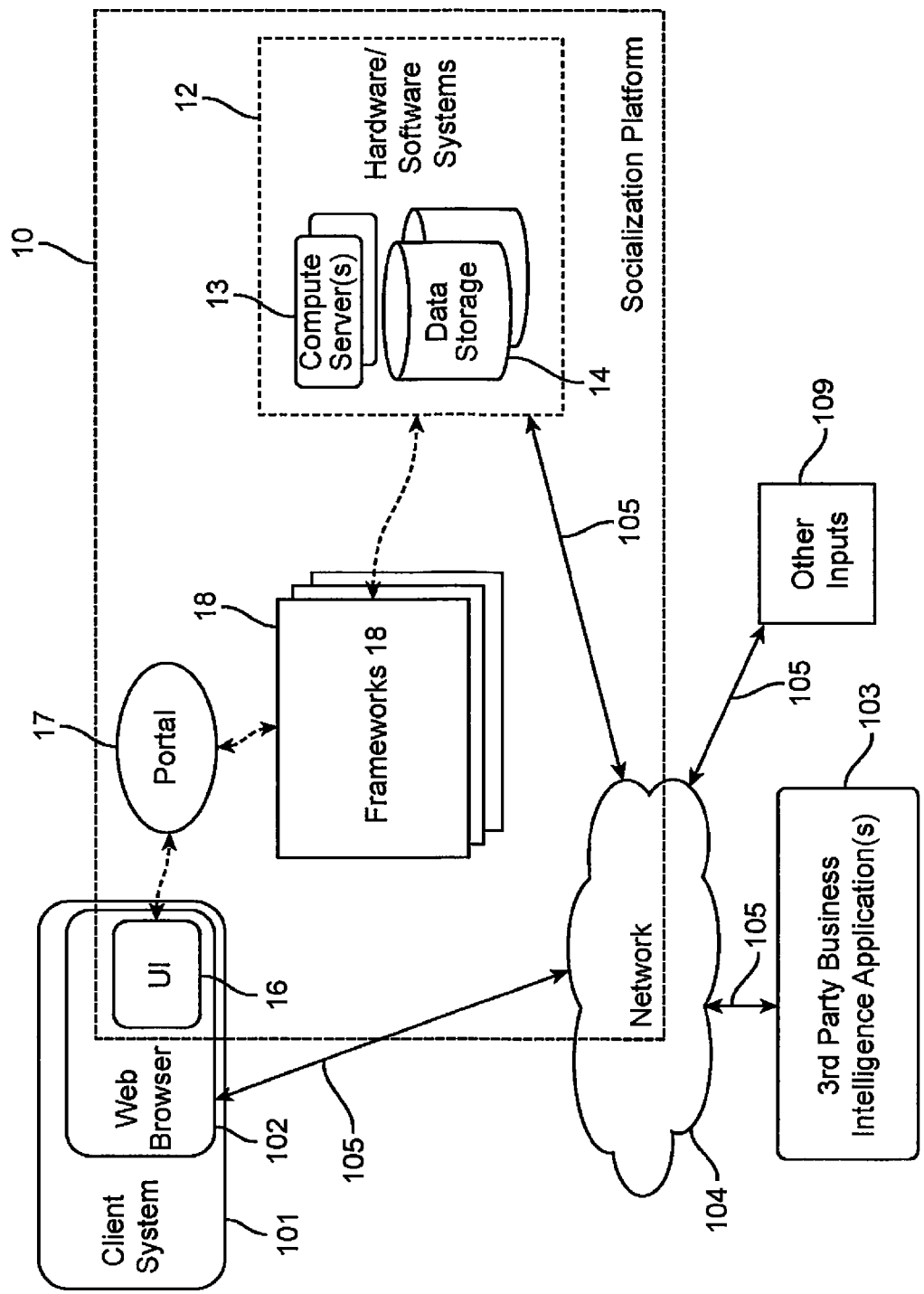
FIG. 1 is a block diagram illustrating an overall embodiment of systems according to the present disclosure.

Disclosed embodiments comprise software-implemented solutions that extend current capabilities of Business Intelligence (BI) tool to address existing gaps and problems by providing the ability to collect information from subject matter experts, debate that information and disseminate the information to interested stakeholders. In one example, as depicted in FIG. 1, socialization platform 10 comprises hardware/software systems 12 including one or more servers/processors 13 and data storage 14. Hardware/software systems 12 contain instructions configured to generate user interface (UI) 16 in a client system web browser 101/102 allowing users to access collaboration portal 17 through which the user may interact with a series of frameworks 18 configured and provided by hardware/software systems 12 and instructions contained therein. As described in greater detail below, and illustrated in FIG. 6, frameworks 18 comprise, but are not limited to, Insight Framework 210, Story Framework 220, Discussion Framework 230 and Newsfeed Framework 240, each of which, when invoked, facilitates unique user interactions with data visualizations imported from integrated BI tools 103 or other user or client configured inputs 109. Socialization platform 10 is connected to and communicates with client systems 101 and one or more third-party BI tools 103 via network 104 and network traffic 105 is provided over suitable wired or wireless communications links as may be implemented by persons of ordinary skill in computer networking and related arts. For the avoidance of doubt, the network 104 could be fully contained within an organization's network boundaries or could be inclusive of the Internet depending on implementation. The network traffic 105 is via industry standard protocols for web traffic such as HTTP and/or HTTPS, though alternate protocols could be utilized in other embodiments.

Figure 2:
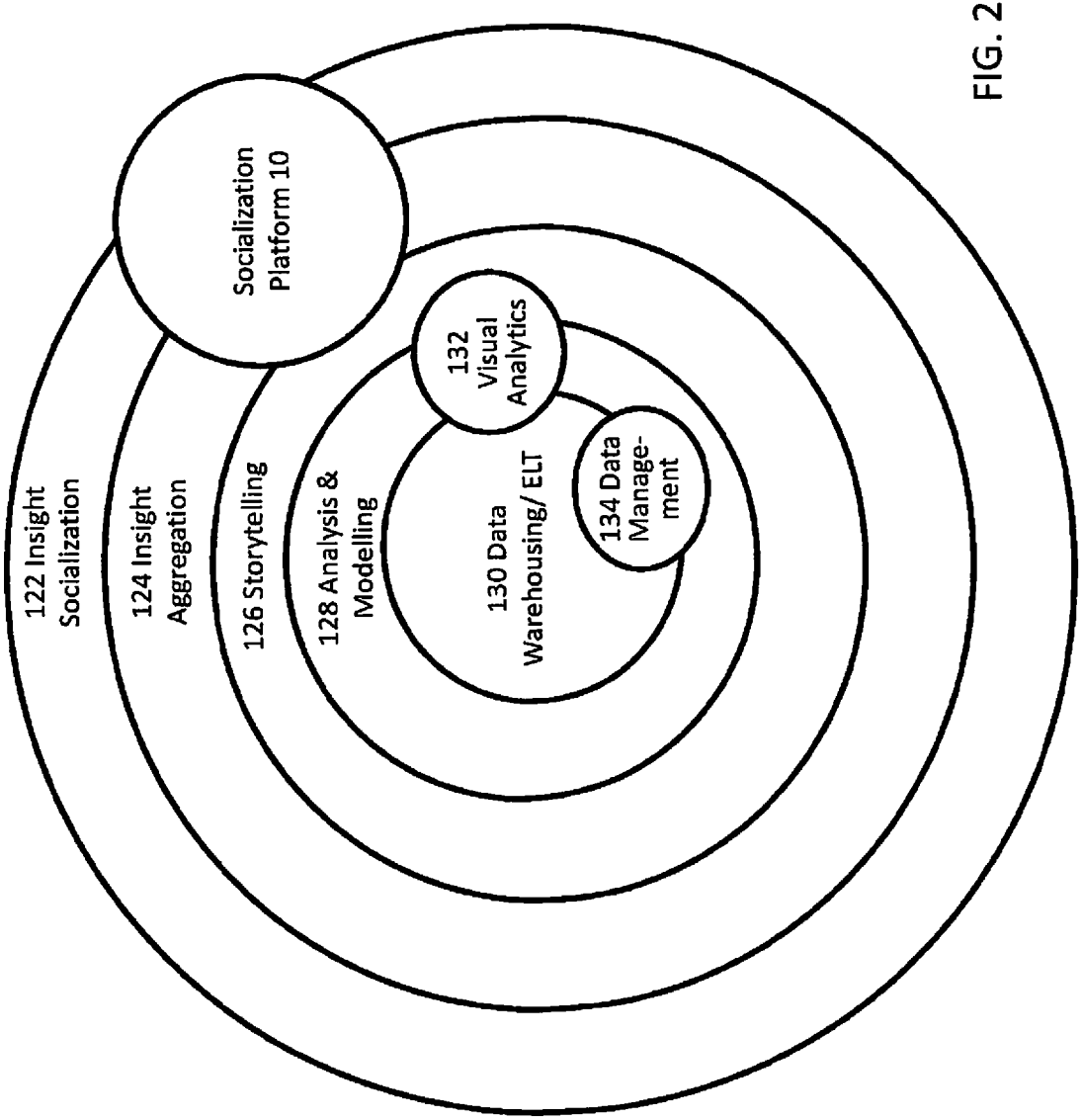
FIG. 2 is a schematic depiction of a socialization platform according to the present disclosure in one implementation integrated into storytelling, aggregation, and socialization layers wrapping the output of BI/DS stacks.

As further illustrated in FIG. 2, socialization platforms 10 according to the present disclosure may be configured to aggregate content across a plurality of BI/DS tools, which is not available in any single prior art BI tool, such as visual analytics tools 132 or data management tools 134 augmenting the traditional capabilities of BI tools, analysis and modeling 128 and data warehousing and ELT processes 130, to include functionality such as insight socialization 122, insight aggregation 124 and storytelling 126. Several tools 132 exist in the art to provide data warehousing, data visualizations and analysis capabilities all in one package, of which Tableau, Birst and PowerBI are a few examples. Other tools 134 like Snowflake and Databricks are more focused on the data warehousing and modeling, together making up a data management solution. Some prior art BI/DS tools have a limited socialization functionality to simply share insights generated within the particular tool with other users, however, there is a need for tools configured and optimized to aggregate and socialize content from across multiple BI/DS tools. Through the use of collaboration portals of the present disclosure additional data and insights are generated during the socialization/collaboration process. Systems of the present disclosure may be configured to persist the data generated through socialization, such as questions and answers about published Insights and Stories by storing the socialization data in storage for future reference. The collaboration portal may be configured to perform or provide functions such as searching, filtering, clustering, automatic recommendations of related content, among others as described herein.

Figure 3:
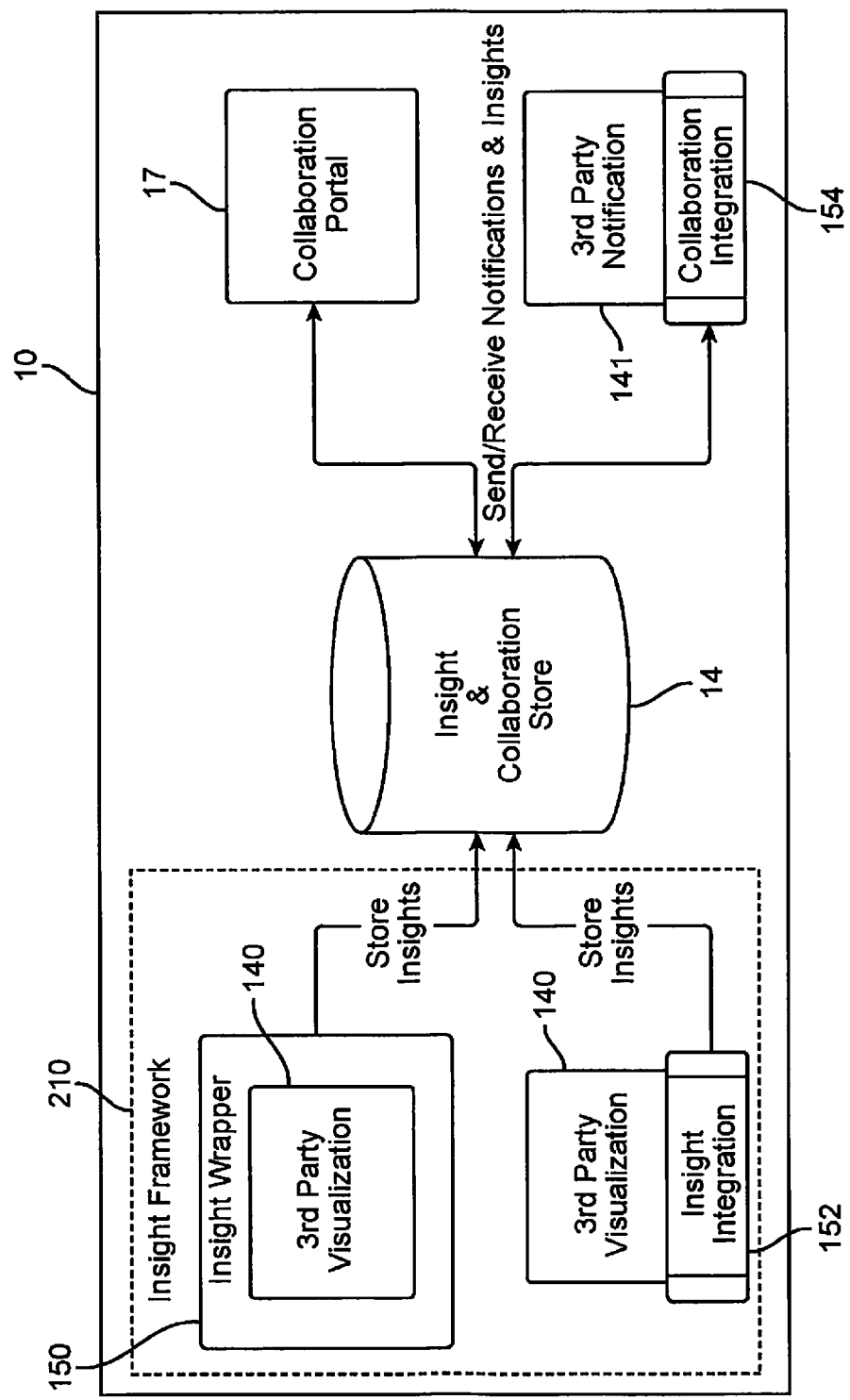
FIG. 3 is a high level block diagram illustrating aspects of a socialization platform with a collaboration portal providing access to an insight framework and data store according to the present disclosure.

Socialization platforms 10 and, in particular, frameworks 18 accessed via collaboration portals 17 of the present disclosure may be configured to enable dynamic and interactive collaboration of teams around data and data visualizations 140. For example, as shown in FIG. 3, functionality provided includes dynamic publishing of data visualizations, the ability to provide commentary and additional information regarding the visualization (referred to herein as "Insights") via insight framework 210. Insight wrapper 150 provides a mechanism for displaying static or embedded data visualizations within a standardized UI, allowing analysts to succinctly socialize findings (e.g., by posting Insights to a Newsfeed, sending to a third-party messaging application via an external integration, etc.) and containing all associated social interactions (such as "likes" or threaded comments). Insight integration 152 provides a mechanism for embedding data visualizations from third-party BI tools directly into the aforementioned Insight wrapper, so that analysts working in third-party software are able to socialize their output in the same way. Sharing and push notification of the visualizations 140 and Insights, the ability to interact with and ask questions regarding the Insights and visualizations 140 as well as the ability to collaborate in real time on the shared content can be enabled via collaboration portal 17. In some examples, collaboration portals 17 are designed to be agnostic to the BI tool 103 that creates the initial data visualization 140, but is integrated in such a way that the additional capabilities around sharing and collaboration are easily accessible to the user of the third-party tool and can be retrieved from data store 14.

Third-party BI tools 103 used to produce visualizations 140 could be any number of commercially available or open source BI tools that allow for data analysis and creation of a visual display. Examples of some of the more commonly known BI tools in the space are Tableau and Microsoft PowerBI, but the present disclosure is not limited to or constrained by use with or integration of any specific third-party BI tool. In another example, implementation of socialization platform 10 by a business entity may utilize multiple third-party tools 103 and other external inputs 109, all contributing visualizations 140 for creation of Insights within the collaboration portal. Additionally, third-party notification systems can be integrated within socialization platform 10, such as via collaboration integration module 154. Integration module 154 works in conjunction with open source or commercial communications tools (some examples are Slack, Microsoft Teams or Zoom) to enable third-party notifications 141 therefrom within collaboration portal 17. Collaboration integration module 154 provides a mechanism for synchronizing the activity occurring within the collaboration portal 17 with external business and productivity tools, such as calendaring and messaging applications, to allow for interactions such as adding links to portal content (such as Insights) to calendar invitations, sending new content (such as Insights) into the portal from such an application (for example, a messaging application), or receiving notifications about activity within the portal directly within a third-party messaging application.

In some examples, socialization platform 10 via collaboration portal 17 as implemented by frameworks 18 includes functionality for capturing a point-in-time image of a visualization, document or image and stores it along with links back to the original creation tool. In some examples an interactive visualization may be captured as Insights; in some examples the ability to capture an interactive visualization depends on the particular tool. An interactive visualization could be a situation where the screen rendering and underlying data are captured into an object and stored together, and which the user can interact with via (e.g.) hovering and clicking to generate additional detail. One implementation of this could be a combination of HTML, Javascript and Json objects that render a graph, that when displayed in the collaboration portal, allow the user to still manipulate filter fields to see alternate views of the data and/or highlight data points to get the underlying discrete value.

Figure 4:
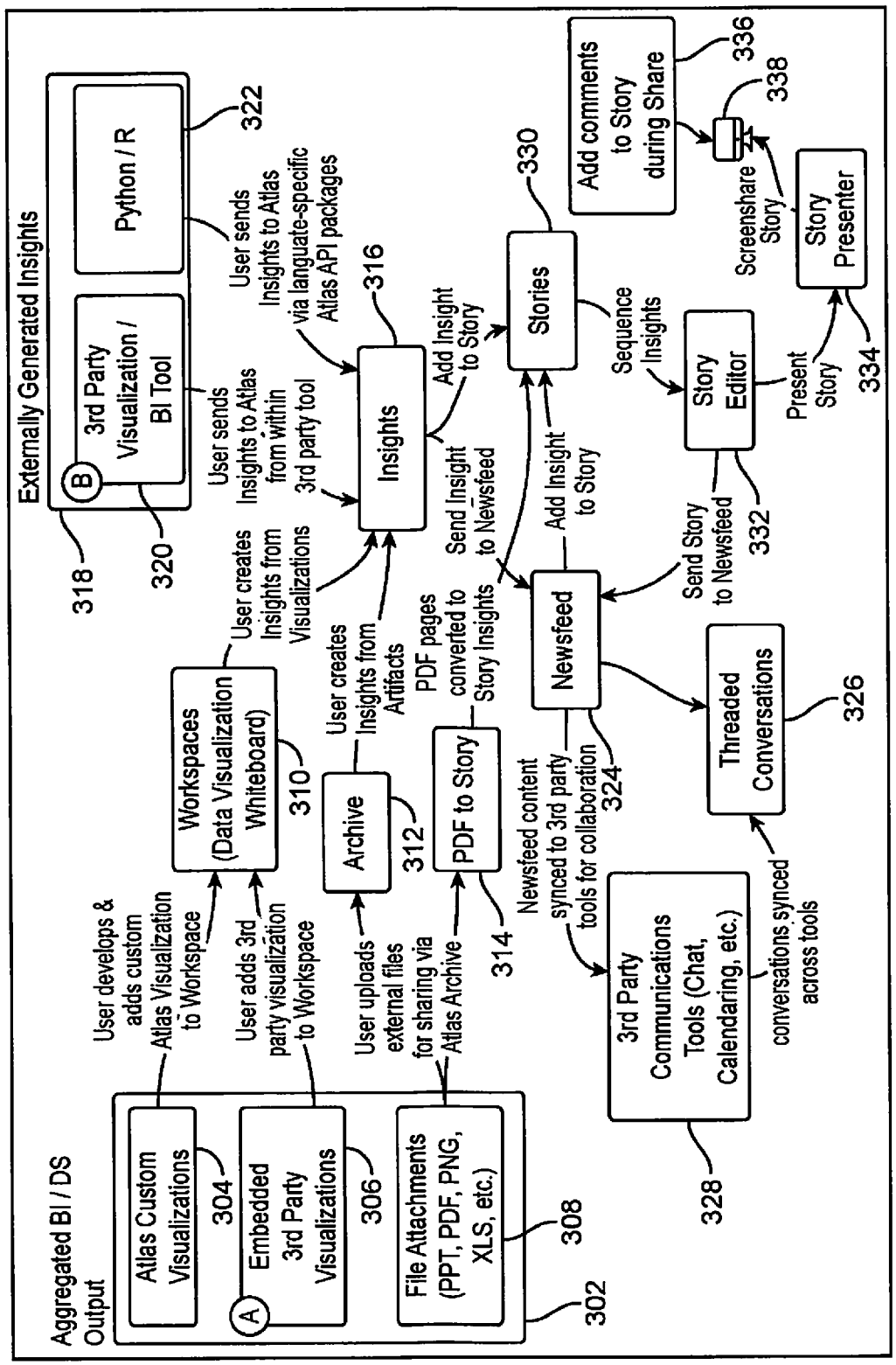
FIG. 4 is a functional block diagram illustrating an example of use conditions according to embodiments disclosed herein.

As further illustrated in FIG. 4, in various embodiments, socialization platform 10 provides several features to enable the overall workflow and enhanced user collaboration experience via collaboration portal 17. In this example, a newsfeed 324 is driven by AI-based recommendations and location for viewing and interacting with Insights 316 and other users in the situation where third-party notification systems are not available or integrated. Functionality for advanced collaboration is where users can work together to annotate, mark up and exchange ideas on the different visualizations/Insights (a data-enabled virtual whiteboard), and have the ability to organize multiple insights and comments into a sequence for presentation, defining a "Story". This allows for a data analyst to curate a narrative utilizing several insights from various sources into a presentation format for real time or off-line sharing (via the newsfeed, invitations, notifications, etc.). User Management provides the ability to assign roles and responsibilities to different users of the system. This enables the comments and notifications to be directed to individuals or groups of individuals. Insight creation and interaction is, in the case where a user copies a screenshot, PDF file or other source of content directly into the Collaboration portal and creates an Insight utilizing that content.

FIG. 4 is a user flow model of one embodiment of the invention, with the boxes representing the functional components that make up the capabilities of the solution. There are two primary mechanisms for adding data to the socialization platform as outlined in 302 and 318. 302 represents the collection of third part visualization integrations 306, proprietary data visualizations 304 and file inputs 308 that are the images that can be used to formulate insights 316. Custom visualizations 304 and embedded third-party visualization 306 provide the interactive data visualizations that are used as workspace widgets to create the workspaces 310, this is further refined in FIG. 11. File Attachments 308, Archive 312 and pdf to story 314 are further refined in FIG. 10 as making up the archive/object framework 400. In some embodiments, alternate integrations 318 are possible. Some BI tools will allow for custom extensions that allow for workflows where the insight creation is initiated directly from the BI tool 320 via a menu option and API call. In other scenarios, the invention exposes an interface that allows a programmer to send insights, the images and metadata describing the interpretation triggered by external software/code 322 to populate the socialization platform via an application programming interface (API), 625 in FIG. 12. The insights 316, stories 330, threaded conversations 326 and newsfeed 324 are the user flow representations of the frameworks 210, 220, 230, and 240 respectively, in FIG. 6. From either newsfeed 324 or threaded conversations 326 third-party communication tools 328 may be invoked. This diagram further outlines some of the possible connections between the frameworks that a user might expect to be present. The story editor 332 is a user interaction that is supported by the story framework 220, in FIG. 6, where an existing or new story can be modified or composed from the insights in the data store. Story presentation 334 is an additional user scenario supported by the story framework 220 where the user interface presentation hides the user interface elements needed for editing the story and provides a simplified and streamlined user interface containing the story contents. Once the story is organized as desired by the user, they have the ability to present and collaborate on the story as described in FIG. 11 for workspaces. Boxes 338 and 336 represent the collaboration capability as two users interact with the same story via the event synchronization component 520 (FIG. 11).

Figure 5:
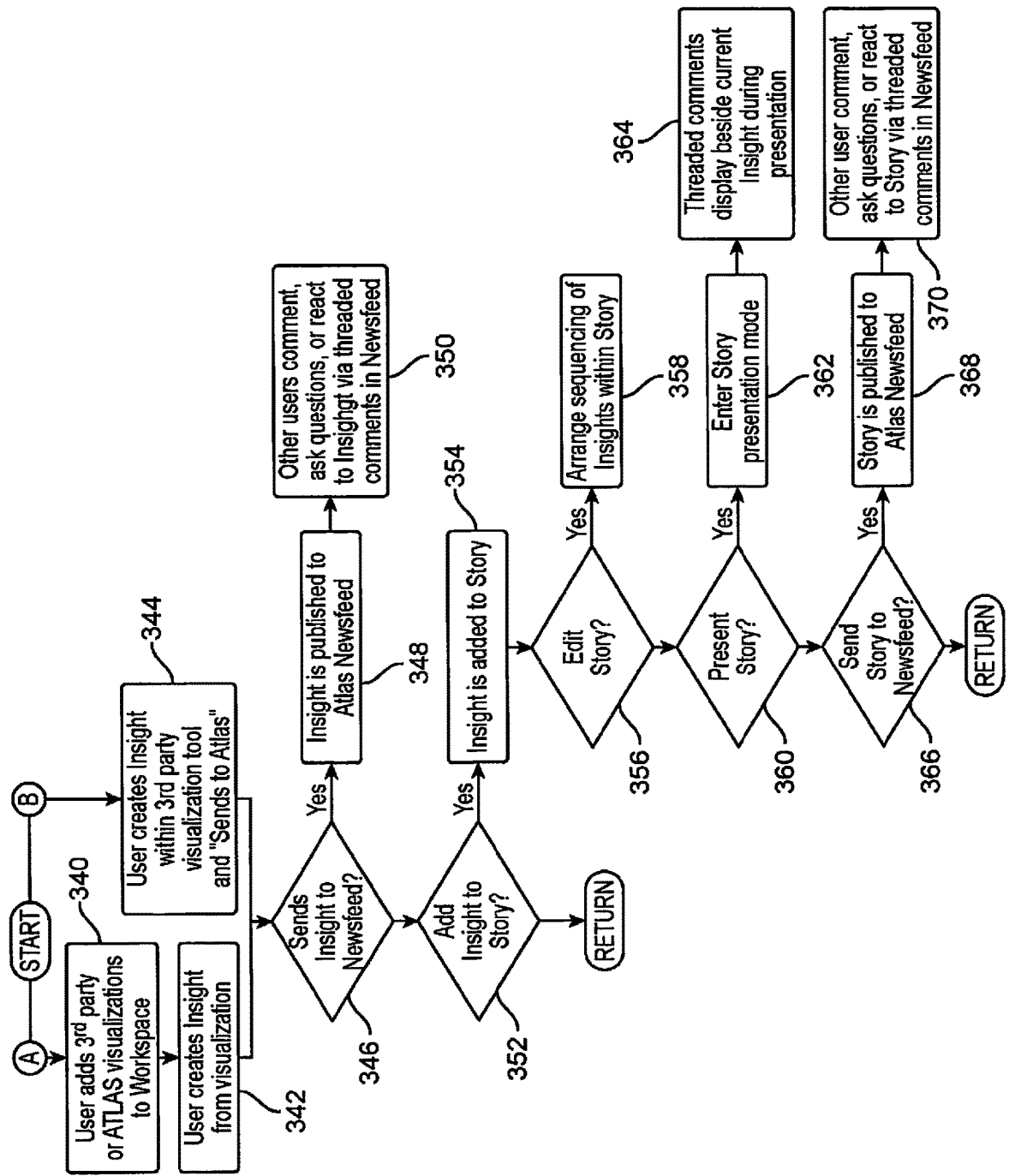
FIG. 5 is a flow diagram illustrating an example of a process flow for the use conditions illustrated in FIG. 4.

FIG. 5 is a user flow model of one embodiment of the invention, with the boxes representing the functional components that make up the capabilities of the solution. There are two primary mechanisms for creating an "Insight" in the socialization platform is outlined in 340-342 and 344. 340 represents the ability for a user to create a visualization of data within the system either using by embedding a visualization (e.g., via a URL) generated by a third-party tool or else using data visualization functionality native to the system. A user can then create an Insight 342 from this visualization inside of the system. Alternatively, a user can create an Insight for the system directly within a third-party data visualization software 344, making use of a custom integration that allows that software to send these Insights from that software into the collaboration portal. Once the Insight is in the collaboration portal, a user may choose to send the Insight to the Newsfeed 346, in which case the Insight is displayed on the Newsfeed 348 for all users with permissions to view it, and socialization of the Insight is afforded via threaded conversations among users below the Newsfeed Insight 350. Separately, a user may also choose to add an Insight in the collaboration portal to a Story 352, which provides a mechanism for sharing a collection of Insights bundled together. A user may either create a new Story or add the Insight to an existing Story 354. Subsequently, the Story may be edited 356, consisting of, e.g., arranging the sequence of Insights inside the Story, adding a summary or action items, or adding a cover page 358. If a Story is presented 360, the Story editor switches to a presentation mode 362 in which the Insights of the Story can be presented separately as in a slide show, with threaded comments attached to each Insight 364 displayed on screen. If a user chooses to send a Story to the Newsfeed 366, the Story is displayed on the Newsfeed 368 for all users with permissions to view it, and socialization of the Story is afforded via threaded conversations among users below the Newsfeed Story 370.

Figure 6:
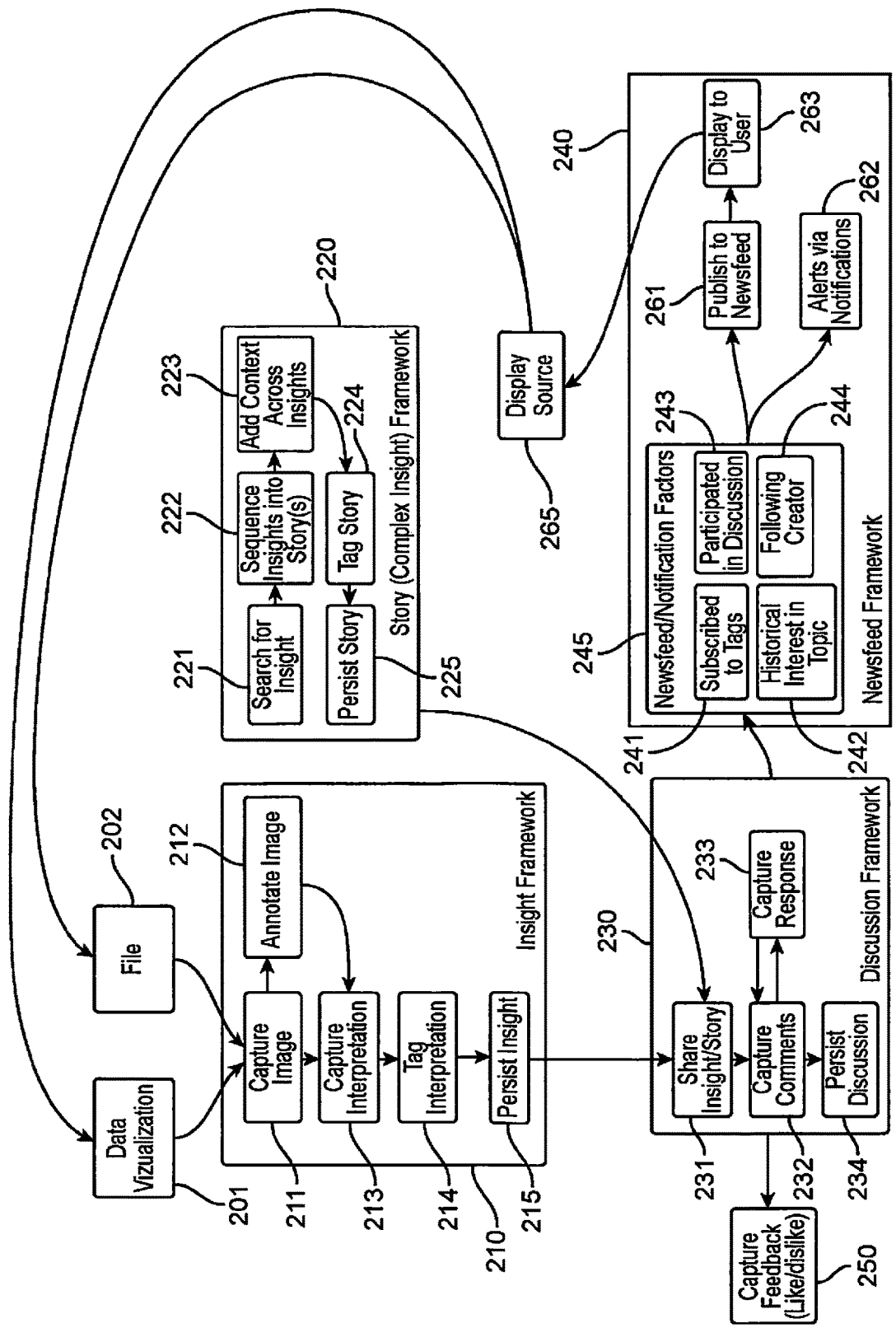
FIG. 6 is a block diagram illustrating an exemplary framework structure and process flow for an embodiment of a socialization platform according to the present disclosure.

In a further embodiment of the present disclosure, data visualization 201 is displayed to a user via UI 16 as configured on client web browser 102 by socialization platform 10 (see also FIG. 1). The user then initiates insight framework 210 from a button, link or other user interface element presented within UI 16 (see also FIGS. 13-21). Insight framework 210 allows for the creation of an Insight, which may comprise a combination of images, annotations, a textual interpretation of the image and zero or more tags as defined herein. As illustrated in FIG. 6, Insight framework 210 captures an image 211 of the data visualization 201. Using tools generated and presented within UI 16, a user has the option to additionally annotate (add circles, arrows, etc.) to the captured image 212. UI 16 further provides fields to allow for the entry of interpretation text 213 associated with the images. The user can also then create a new or select from a list of existing tags, zero or more tags 214 to further categorize the insight. The insight is then stored/persisted 215 in the data store 14 (see FIGS. 1 and 3).

Initiation of discussion framework 230 provides for further user interaction with one or more insights. Once an insight is created, it is available to be shared 231 via discussion framework 230 with a community of users, for example users that are registered by publishing to a newsfeed 261 or via alerts to other end users 262. Users can then interact with the Insight by capturing comments 232 or registering an emoticon response 250 (thumbs up/down). Capture in this usage requires a user interface implementation that allows for the entry of text or audio clips, the electronic communication of that data to the servers where the processor will persist the text or audio clip to the data store and the processor will subsequently retrieve and transfer that data to the client software which will display those elements as part of the Insight going forward. Responses to the comment 233 are also then captured by the user interface, stored in the data store and subsequently displayed to all views. This back and forth sequence of comments/responses documents a Discussion (the Insights/Story and associated comments and responses) around the Insight's original interpretation. Discussion framework 230 may be initiated automatically upon user actions to share insights.

Figure 7:
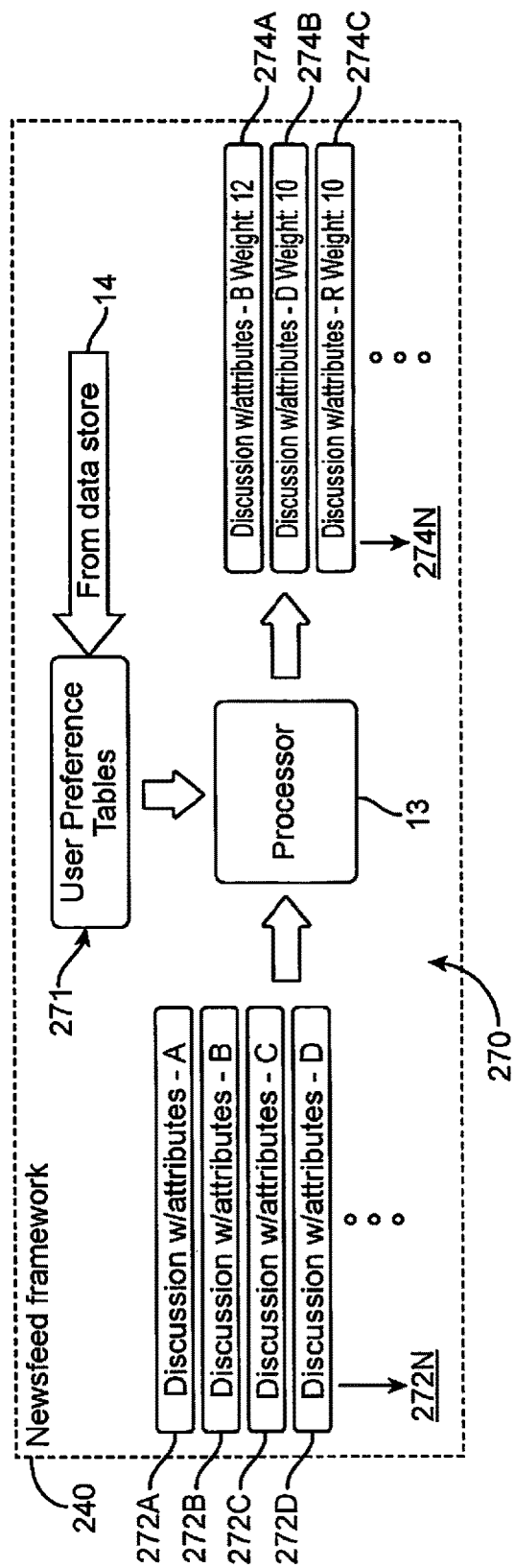
FIG. 7 is a block diagram illustrating a newsfeed processing algorithm according to an embodiment of the present disclosure.

Furthermore, once a Discussion is stored in the data storage (persist discussion 234) it is available for viewing by stakeholders. In one embodiment, this is accomplished via Newsfeed framework 240 which configures a prioritized newsfeed 261. The stakeholders access their client system 102 and views the newsfeed 263 via a web page, which may be displayed in system UI 16 or accessed through a general purpose web browser. To accomplish this, the processor 13 queries the set of discussions stored in the data store 14 and filters the set based on criteria 245, which may comprise selected newsfeed or notification factors. As shown in more detail in FIG. 7, in newsfeed processing 270, to filter the discussion set, processor 13 will execute a filter instruction set configured to retrieve the criteria preferences 245 from the data store 14, which in some embodiments may be maintained as user preference tables 271. Filter instructions further configure processor 13 to iterate through the discussion set and attributes (272A to N), and compare the criteria values to each discussion and assign a weight to the discussion creating weighted discussions (274A to N) based on how many criteria the discussion matches on. Display to User 263 (FIG. 6) will then exclude any discussions without a weight and the remaining discussions will be included in the displayed web page with the highest weighted items first.

Several filter criteria are possible and devisable by persons of ordinary skill based on the teachings contained herein, but a subset of the criteria are called out here as nonlimiting examples. In criteria 241 the user has previously viewed the list of tags that have been added to discussions and flagged some tags as interesting to the user. Criteria 241 is accomplished by the processor querying the data store to find the set of all tags added to discussions, transmitting them to the client system via a web page, allowing the user to select zero or more of the tags, transmitting those selections to the processor and then storing those selections in the data store associated with the user preferences. Once those preferences are stored, they will be retrieved and used in the display to user 263 filtering as described above. If a new comment/response has been added to a discussion, then criteria 243 will ensure that a user who was the creator of a previous comment or response in that same discussion is notified of the update. Criteria 243 is accomplished by the processor comparing the unique user id of the logged in user to the user_id attribute of each comment response that is associated with the discussion and setting the weight value to a non-zero value. In "Historical Interest in Topic", criteria 242, the processor retrieves from the data store the set of all discussions that the user has participated (e.g., where the user was the creator of a comment or response) in the past, the processor then iterates through the set and stores in memory each of the nouns found in the discussion title (the interest set), the processor then compares the nouns found in a new insight description (the insight set) to the interest set and assigns a weight to the new insight or a discussion containing the new insight based on the number of matches between the two sets. Following creator criteria 244 is accomplished by the processor retrieving from the data store a pre-established list of creators that the user wishes to follow. Creators are the list of users that have added insights, comments or responses to the data store. In a similar fashion to 241, this embodiment would allow for the storage of user_id's that the user would like to follow, the processor will then retrieve that set of user_id's (the preference set) and compare the user_id's in the discussion set to the preference set for assignment of the weight.

Figure 8:
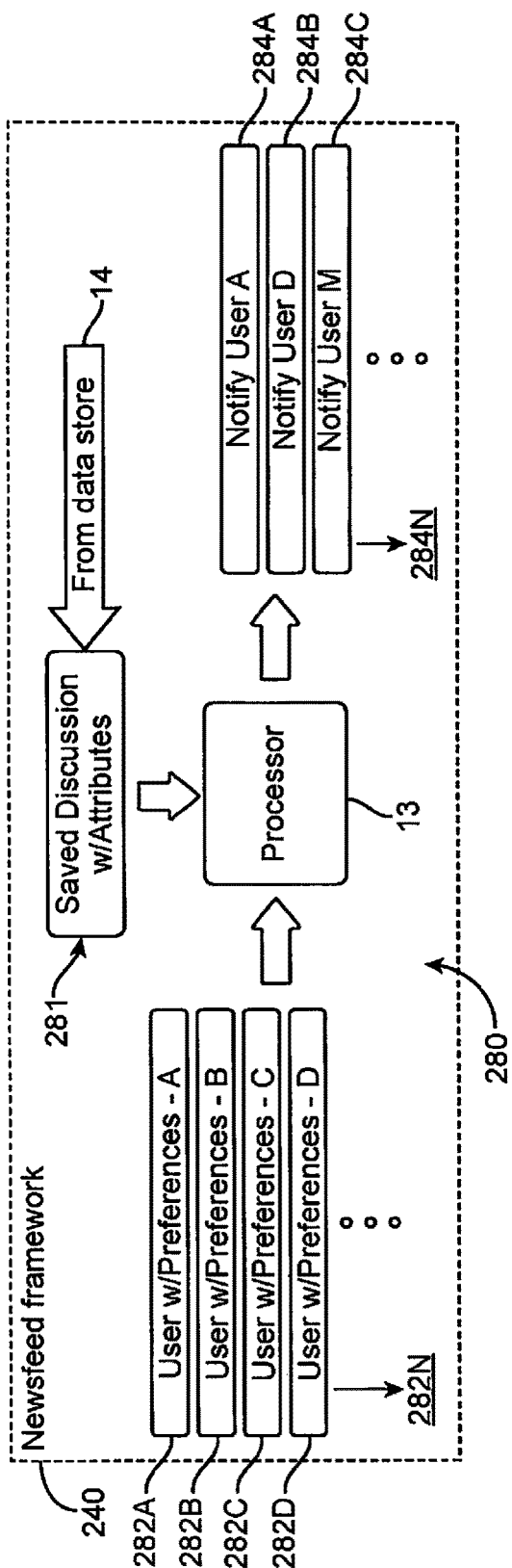
FIG. 8 is a block diagram illustrating a notification processing algorithm according to an embodiment of the present disclosure.

Alerts via Notifications 262 utilizes a similar logic for Notification Factors 245 to determine if a newly stored discussion should be communicated to the user. As shown in more detail in FIG. 8, notification processing 280 to produce alerts 262 comprises processor 13 determining the weight value of the newly stored discussion 281 as it pertains to each user in the system. The processor retrieves each user with associated preferences (282A-N) from the data store, evaluates the Notification factors, as described above, for each user of the system on each discussion store event. For any user that the discussion weight is greater than zero, the processor 13 will add a user notification row (284A-N) to the data store that includes the InsightID and the UserID to indicate the user should be notified of the most recent updates. The Notification is generally accomplished by the processor pulling the list of InsightIDs for a given UserID when that User logs into the client system web application, creating a web page of the insights and displaying that within the application. Some manifestations may have a visual indicator, like an alarm with a count of the number of notifications associated with the user, upon user login.

Referring again to FIG. 6, once an Insight is Displayed to the User 263, the user interface also provides the ability to navigate back to the original source of the insight image 265. The insight display 263 retrieves an integration link/URL (the link) from the data store, returns the link to the client system browser which displays the link or a button that may be triggered by the user. That triggering will result in the browser launching the original data visualization 201 or File 202 that the insight was created from.

There are also scenarios where more than one data visualization is necessary to explain a particular interpretation of the data, these are complex insights referred to as Stories, which are created in Story Framework 220. In this scenario, the user can use UI 16 to enter search criteria (search for insight 211), typically as a text string, that is then communicated to the processor 13 which will use the search criteria to query the data store 14 for all of the Insights that match the criteria. The set of Insights is returned to the processor which then renders a web page with the description of each insight that is returned to the client system for display to the user via UI 16. The user can then select the insight(s) that are relevant to their story. Via the user interface the user can add a title for their story, organize the selected insights into a preferred order (via drag-and-drop typically) 222 and add text strings to help explain the relationship between the selected insights 223. Lastly, the user can select tags 224 to add to the story before persisting the story to the data store 225. The story is then treated identical to the Insight in the Discussion Framework 230, to include Publishing to Newsfeed 261 and Notifications 262. Alerts via Notifications 262 can also be triggered by an anomaly detection component.

Figure 9:
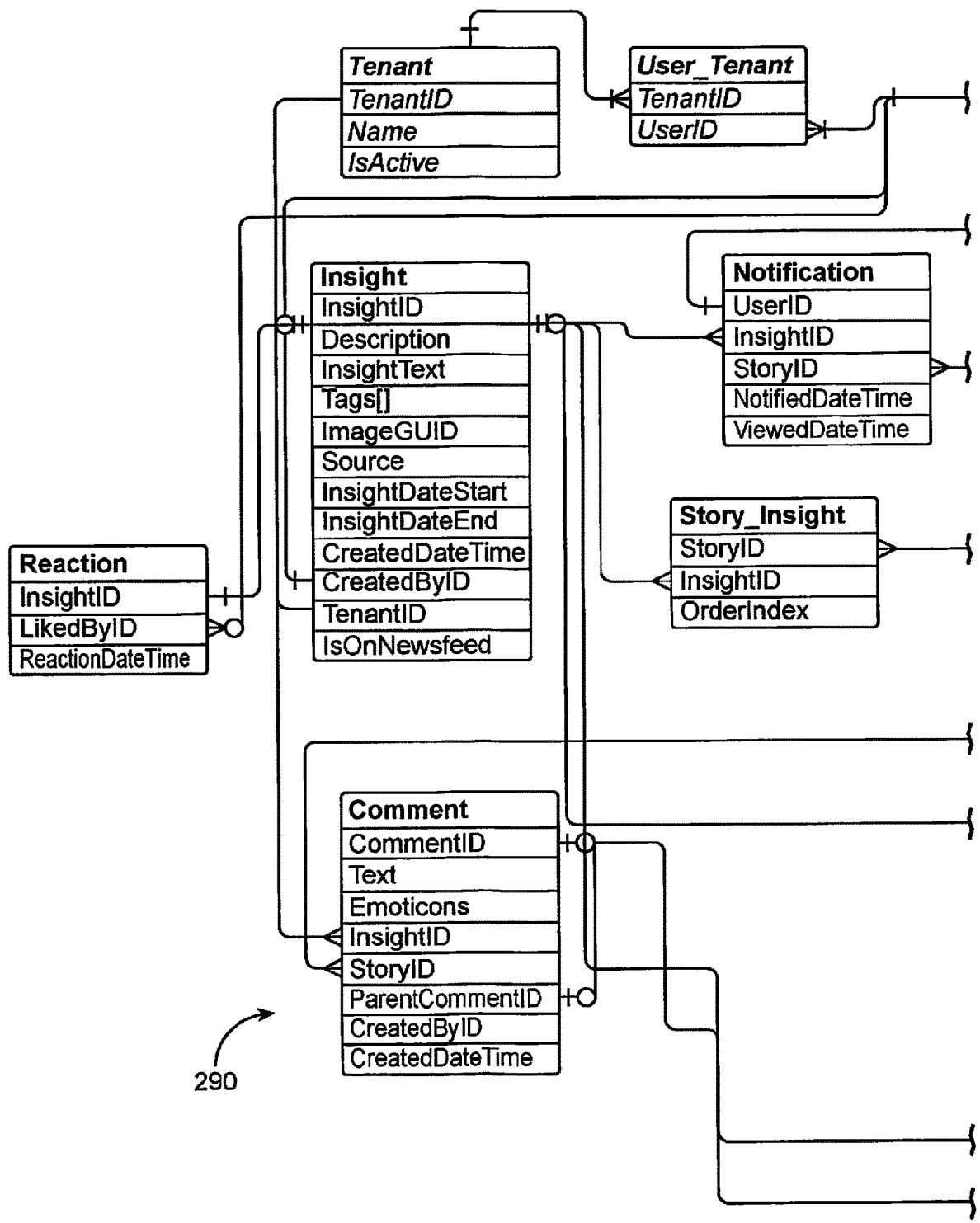
FIG. 9 is an entity relationship database (ERD) diagram illustrating an embodiment of an ERD according to the present disclosure.
Figure 9:
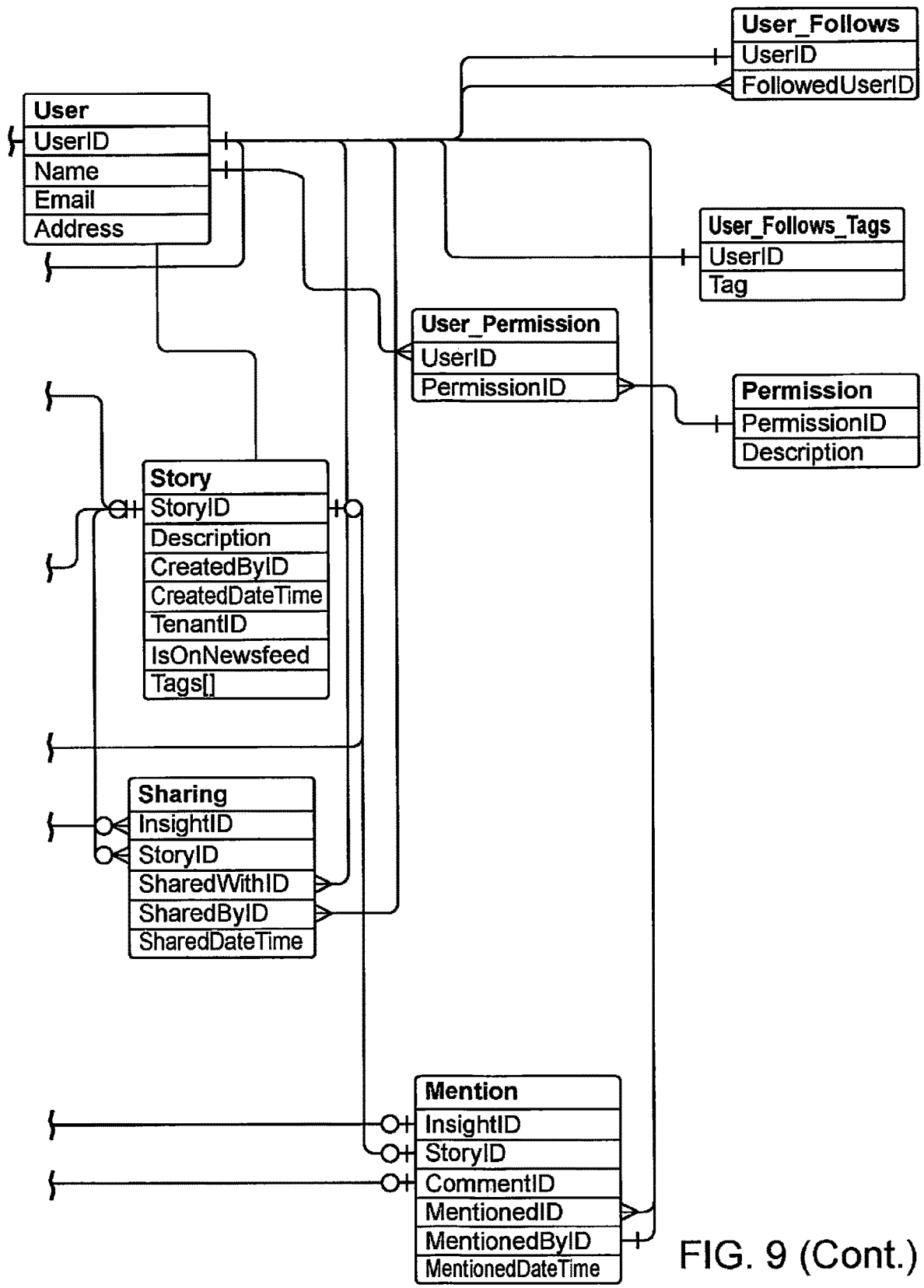

In further alternative embodiments, data store 14 may be structured as an entity relational database (ERD), one example of which is schematically depicted as ERD 290 in FIG. 9. As illustrated therein, ERD 290 is a data store configured as a relational database to implement a schema that allows for the storage and retrieval of data specific to socialization platform 10 and, in particular, frameworks 210, 220, 230 and 240. In this embodiment the following concepts are covered as a representation of the data, other embodiments and data elements:

Tenant: Tenant is the overarching owner of the data being managed. One software implementation of the invention could support 1 or more tenants, where users and data are scoped to the tenant level and a user of a tenant can only interact with data associated with that tenant.

User: A human, or third-party system that is interacting with the user interface of the software. All data collected in the system will also indicate which User created the data via the CreatedBy ID value.

User_Follows: The list of UserID's that a user has selected to follow and be alerted when they add content to the system, see 244.

User_Follow_Tags: The list of tags that a user finds interesting and would like to see content related to. See 241.

Insight: An image of the data visualization combined with the impression text, and defining attributes.

Story: A container object designed to associate one or more insights into a discussion with a standalone interpretation and additional context.

Comment: A follow on text string associated to an insight, story or comment. This is the main mechanism for storing the discussion thread after the initial insight or story is stored.

Mention: A storage location for tracking when one user directs a comment to another user, typically with @username syntax.

Notification: A storage location for user notifications that are pending or have been viewed in the system, populated by the notification sub-system.

In another aspect of the present disclosure, the source of the data visualization is not limited to third-party BI tools per se. Other inputs 109 (FIG. 1) can be sourced from external sources that are not a business intelligence tool user interface. Examples of other inputs 109 include, but are not limited to, a PDF file, word document or other file type that contains graphs and/or images. Other inputs may be ingested and used as File 202, which is then used as the source of the Images 211 within the Insight Framework 210 (FIG. 6).

Figure 10:
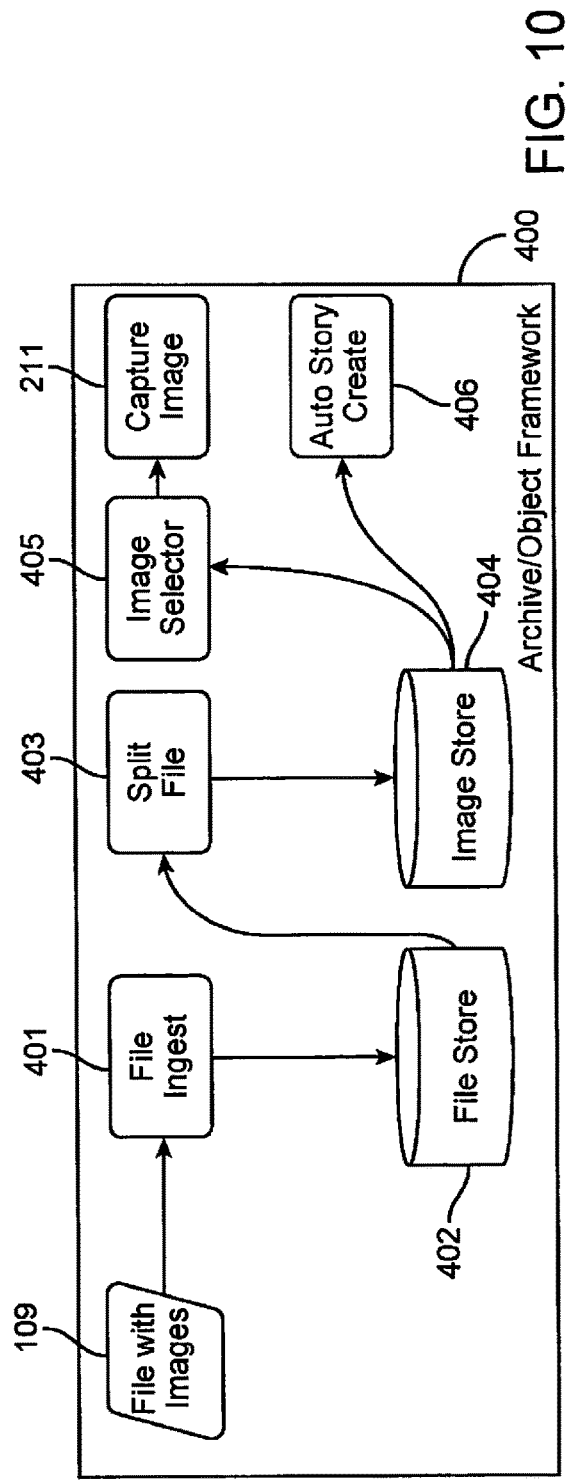
FIG. 10 is a flow diagram illustrating a process flow for socialization of externally provided data visualizations according to embodiments of the present disclosure.
Figure 11:
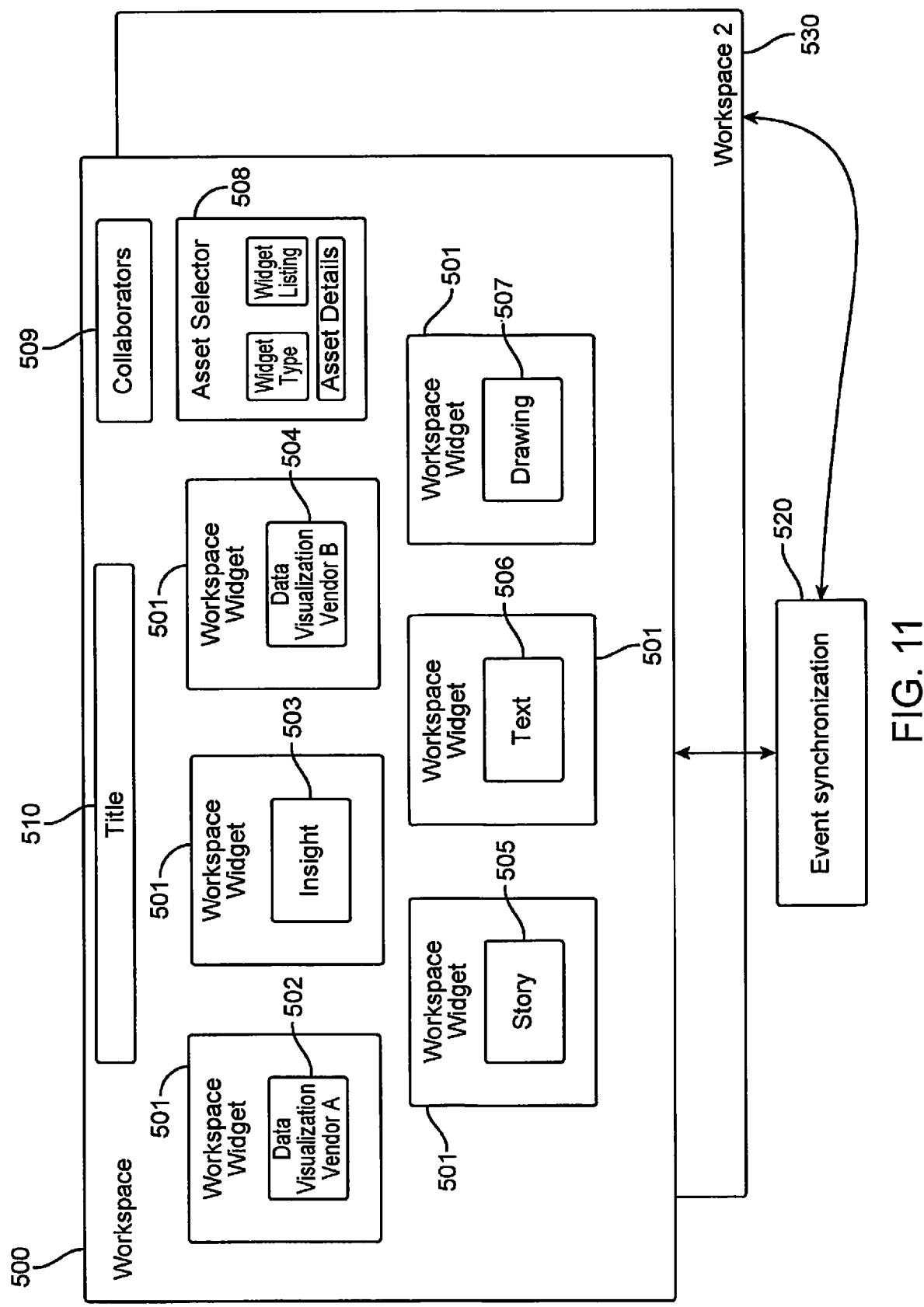
FIG. 11 is a block diagram illustrating a workspace canvas according to an embodiment of the present disclosure.

FIG. 10 illustrates one example of a technical implementation comprising Archive/Object Framework 400, which may facilitate utilization of other inputs 109 as the data source, and which can be broken down into several components. A File Ingest 401 component configures of a user interface (e.g. UI 16) that allows for the selection of the file from the client system hard drive. That selected file is then transmitted to the File Store 402 component and persisted within the socialization platform. The file is then retrieved from the File Store 402 by the Split File 403 component that iterates through the file contents to identify encoded images within the file, and extracts them into discrete image objects that it then persists to the Image Store 404. The Image Selector 405 is a user interface component that displays a list of the image objects in the Image Store 404 to the user. The user may then select one or more images to communicate to the Capture Image 211 component, which is part of the Insight Framework 210, described earlier. Alternatively, the File Ingest 401 component also captures a flag to auto create a story from the File. This could be accomplished with a checkbox UI component or a dedicated "create story" button on the interface. In this scenario, after the images are stored in the Image Store 404, the Auto Story Create 406 would trigger the processor to iterate through all of the created images and create insights in the data store and a story combining all of the insights created from the file that is also persisted to the data store. That new story is then available to the Story Framework 220, for editing or modification.

As a further aspect, socialization platforms 10 according to embodiments of the present disclosure comprise a Workspace construct, which is a form of a digital data whiteboard where end users can collaborate around data assets (insights, stories, data visualizations, etc.) in real time via collaboration portal 17 configured in UI 16. In one implementation, as shown in FIG. 11, Workspace 500 is a container object that has both a user interface component and a data storage component. The Workspace 500 contains one or more Workspace Widget objects 501 that are arranged within the visual layout of the Workspace in relation to each other. The workspace is then saved to the data store maintaining the list of widgets selected, their relative position in x, y coordinates, the Title 510 of the workspace and the list of Collaborators 509 selected to participate in the workspace collaboration. Each Workspace Widget 501 includes a child component that is the data to be displayed (Insight 503, Story 505, Data Visualization 502/504, Text 506, Drawing 507, etc.). The list of child components here is representative and is not meant to be exhaustive. One could see expanding the list with gifs and/or videos as an example. In an example embodiment, Workspace Widget 501 is implemented as an HTML control that is hosting a DIV tag that further embeds the child component. The Workspace widget maintains the application programming interface (API) necessary to allow the Widget to be selected, moved around and placed on the workspace, generally including drag and drop, maintaining x,y coordinates as well as basic sizing and resizing capabilities.

Asset Selector 508 allows for the user to pick preconfigured data assets (the combination of the workspace widget and the child component) or create new data assets. In one embodiment, this is accomplished by allowing the user to select what type of widget they would like to select (Insight, Story, Data Visualization, etc.), the selection is sent to the processor which uses that value to query the data store and return the listing of objects that match the type. The listing is then returned to the user interface for display and to allow the user to select the object of interest from the list. In the scenario that the Widget Type is Insight 503 or Story 505, the query is against the data store established by Insight Framework 210 and Story Framework 220 described earlier. Asset Selector 508 then returns the data asset to the workspace for display. In the simple case of the user adding a text field to the workspace, the Asset Selector 508 returns a simple text box as the child component and the end user can enter their desired text to include on the workspace. In the more complex scenario of embedding a data visualization from a third-party vendor, once the user has indicated the Widget Type of third-party data visualization, the Asset Selector 508 displays the listing of all previous third-party visualizations that have been configured. This is accomplished as described above by requesting a listing from the processor that then queries the data store, returning a listing of matching objects. If an existing visualization is not selected, the Asset Selector 508 allows for the entry of Asset Details, the URL as well as any required parameters as defined by the third-party tool. The user can then name the new data asset before returning the data asset to the workspace for display, 502. One distinction between Workspaces and existing Business Intelligence (BI) tools is that workspaces may contain data visualizations from more than one BI tool and allow for the relative layout and display side by side, as demonstrated with 502 and 504.

In one embodiment, Workspace 500 is persisted to the data store 14 via a series of steps. The client processor serializes the workspace parameters (Tile 510, Collaborators 509, etc.) and the Data Assets into JSON file format in memory, where each of the child components is an object in the file. The JSON file is transmitted from the browser, across the network to the socialization platform and stored in the data store. The process is reversed for the future display of the Workspace.

Collaborators 509 is a user interface component that allows the creator of the workspace to select other users of the system to work on the workspace in parallel. This is accomplished via a user interface component that communicates with the socialization platform processor, which queries the list of users from the data store and returns it to the user interface via the network for display by the browser. The creator of the workspace then selects one or more users as collaborators. Once a user is selected as a collaborator, the system will notify them (email, chat, or notifications within the socialization platform) that they have access to the workspace 500. A collaborator will then log into his/her own client system, launch the application via the browser and be able to see the workspace on their own client system 530. A collaborator on a workspace will see modifications to the workspace by other users in real time. In one embodiment, this is accomplished via an event synchronization infrastructure 520. The Workspace 500 running in the browser on the client system transmits every change in the workspace across the network to the event synchronization 520 system, the event synchronization system 520 then transmit those changes to any (zero or more) of the collaborators' Workspaces 530 that are running on their respective browsers and client systems. Utilizing this mechanism, all collaborators are seeing the changes regardless of which user is making changes. This can be extended to include mouse movements on the client system of user A being displayed on the browser of user B that is collaborating.

Example Technical Implementation Approach

Integrations of third-party BI tools 103 (FIG. 1) that are generating the visualization are very specific to the tools themselves. Each tool provides one or more mechanisms for integrating into other applications and embodiments of socialization platform 10 of the present disclosure and may be configured to support any one or more integration mechanisms. By way of non-limiting example, two examples of integration mechanisms are embedding the visualization and extending the tool, both of which are part of the overall solution, and are described below.

Embedding the Visualization—Embedded visualizations may be implemented via a web page strategy that allows the graphic visualization to be hosted in another product via, for example, an IFRAME or embedded DIV tag. In an example, a BI tool provides a URL that is then configured to be referenced in an IFRAME or DIV tag. The collaboration portal user interface includes collaboration features, such as add insight, and add to workspace included on a hosting page to allow the user to interact with the visualization. The creation of an insight in the portal may trigger a capture of the visualization as a static image (either via API call from the portal to the BI tool or screen capture of the rendering in the portal UI) and then that image and any associated insight text will be persisted to the Collaboration portal storage (see "Collaboration portal platform and third-party Visualizations" below). An example of embedding PowerBI visualizations can be found at https://docs.microsoft.com/en-us/power-bi/collaborate-share/service-embed-secure, which is incorporated by reference herein.

Extending the Tool—Several BI platforms support the ability to extend their user menus and buttons via API calls and configuration. In those situations, aspects of the disclosure may include configuring the BI tool to include options to, e.g., "Create Insight," that would trigger an API call in the Collaboration portal platform and send data visualizations, such as a static image and metadata associated with the visualization in focus.

In addition, integrations are available that allow for a third-party application to send images, PDFs, or other data assets via API or FTP to the collaboration platform. In an example, the socialization platform 10 also provides a webpage that allows the user to drag-and-drop these "assets" from any source tool and have them download to the Collaboration portal platform (see "Insight from External Files" below). In an example these externally generated assets are then stored in the platform as "archive" items that the user can then interact with, manipulating the asset (cropping images, splitting PDFs into multiple pages, etc.), creating insights from the assets, adding the insights to stories and generally treating the assets as another source of visualizations to be collaborated around.

Figure 12:
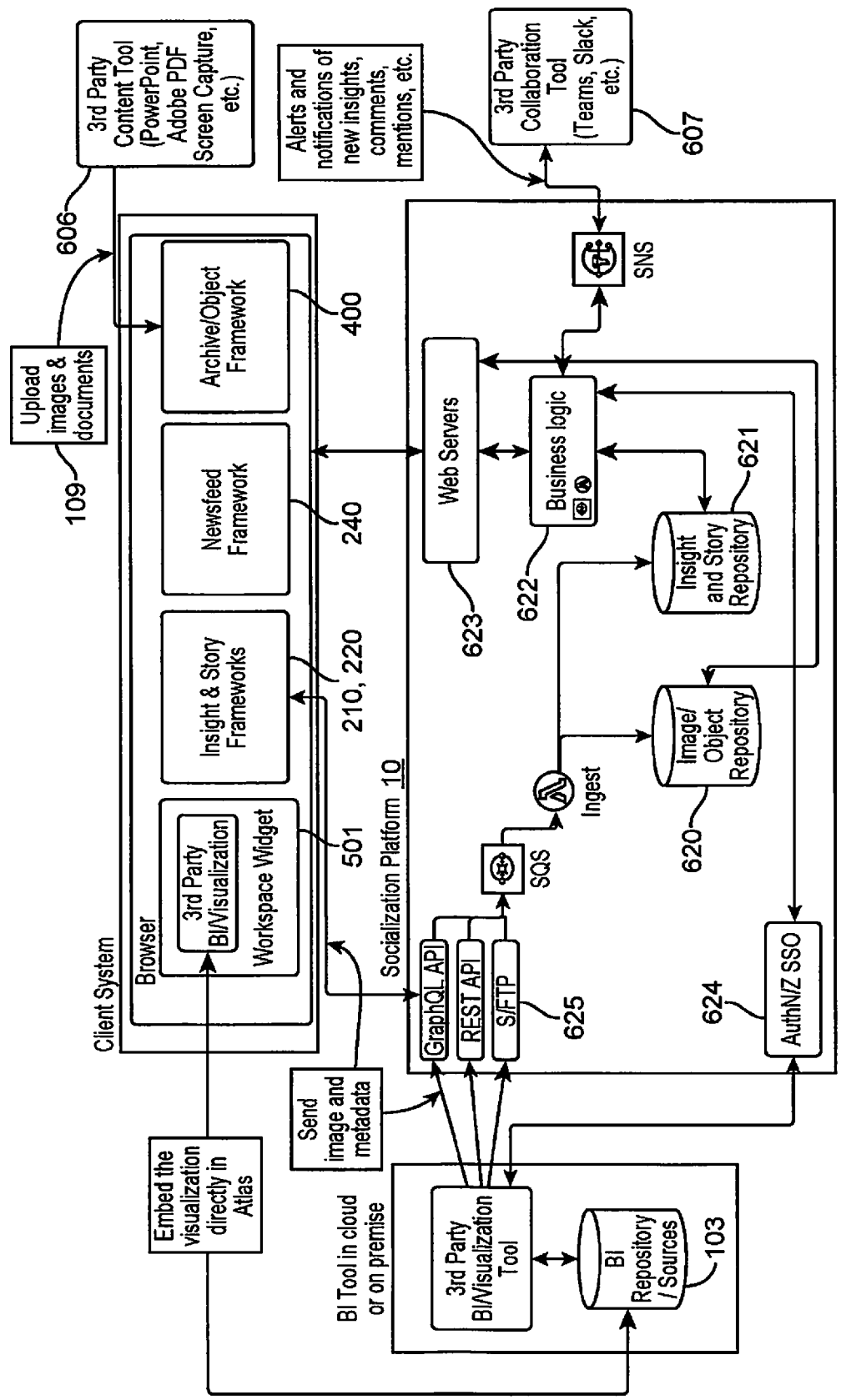
FIG. 12 is a component diagram that outlines some of the major software components that make up system socialization platforms according to the present disclosure and dependencies between such components.

In one embodiment of the disclosure, the collection, storage and management of the data to be collaborated on would be stored in a software solution hosted by a public cloud provider, such as Amazon Web Services (AWS). In this model the collection and management of the images and documents that make up the insight would be implemented as a web-based application utilizing HTML and ReactJS to define the user interface of the product. Additional data acquisition may be provided via GraphQL, SFTP and/or REST API's that are exposed to the source systems. The internal storage of the information would be provided via AWS S3 buckets as well as AWS RDS services where appropriate or any equivalent storage technique. The business logic and any advanced processing (such as prioritization of the items in a newsfeed for a particular user) may be implemented as AWS Lambda functions or equivalent that are coordinated via AWS SQS (Simple Queue Service) or equivalent. External integration to collaboration tools may be achieved via the integration and configuration of AWS SNS (Simple Notification Service) or equivalent that will allow for the distribution of information with commercially available third-party solutions via HTTPS endpoint calls. FIG. 12 illustrates further details of such an embodiment as a further refinement of socialization platform 10 shown in FIG. 1.

As shown in FIG. 12 third-party BI tools 103 are configured with their own data repository and/or data sources as well as data visualizations (charts, graphs, tables, etc.) in accordance with the installation and configuration instructions provided by the BI tool vendor. In one embodiment, software components such as Workspace widget 501, Insight and Story Frameworks 210, 220, Newsfeed framework 240 and Archive/Object Framework 400 may be configured as HTML-based user interfaces as described elsewhere. Workspace Widget 501 embeds a child HTML object that is provided by the BI tool 103 via an IFRAME or DIV tag HTML element. Workspace Widget 501 also provides the ability to capture an image of the visualization for inclusion in the Insight Framework 210. In some BI integrations the Workspace Widget 501 will invoke an API call on the third-party visualization that will trigger the BI tool 103 to send an image across the network to the Socialization platform API layer 625. API layer 625 will then persist the image to the Image/Object Repository 620 for retrieval by the Insight Framework 210. Another part of the BI integrations is the Authentication and Authorization single-sign-on component (AuthN/Z SSO) 624. This component ensures the user mappings from the Insight and Story Repository 621 and the BI tool 103 are established and maintained for a secure system. When a new user is added to the Insight and Story Repository 621, the business logic 622 invokes the AuthN/Z SSO 624 component to create a user in the BI tool 103. When the user requests to view a workspace widget 501, the business logic 622 communicates with the AuthN/Z SSO 624 component that requests a secure token from BI tool 103. The token is then returned via the business logic 622 and the Web Servers 623 to the Workspace Widget 501 that includes the token in the request to embed the third-party Visualization. Image/Object Repository 620 and the Insight and Story Repository 621 comprise data storage 14 (see FIG. 1).

The Alerts via Notifications 262 component (see FIG. 6) is part of the business logic 622 in the implementation depicted in FIG. 12. The notifications may manifest themselves as messages within a third-party chat application or SMS messages in addition to being available in the user interface of the socialization platform. In one embodiment, if a chat integration is in place, the business logic 622 will communicate via Amazon's Simple notification service (SNS) that will communicate the notification message to the third-party chat application 607. At a high level, third-party content tools 606 will create other content 109 files that can be uploaded to the Socialization Platform 10 via Archive/Object Framework 400, an example of which is illustrated in FIG. 10 and described above.

Example User Interfaces and Use Cases

Structure and function of systems disclosed herein is further described in the following examples of user interactions, illustrated by exemplary system screenshots depicted in FIGS. 13-21. These examples illustrate user interaction with system UIs with a plurality of insight creation user control elements and examples for how the user may interact with the collaboration portal as described hereinabove. Beginning with FIG. 13, collaboration portal UI 1200 allows for creation and display of custom and third-party visualizations. For example, at 1202 the user can create and combine custom data visualizations provided by the collaboration portal. The user can create and combine embedded data visualizations from multiple third-party tools at 1204 (e.g., tools such as Tableau, Looker, PowerBI, RStudio, etc.). Embedding of external or third-party visualizations within the collaboration portal is discussed above in connection with FIGS. 10 and 11. As a further option, the user can click plus button 1206 to "add an Insight" to any visualization (custom or third party).

Figure 13:
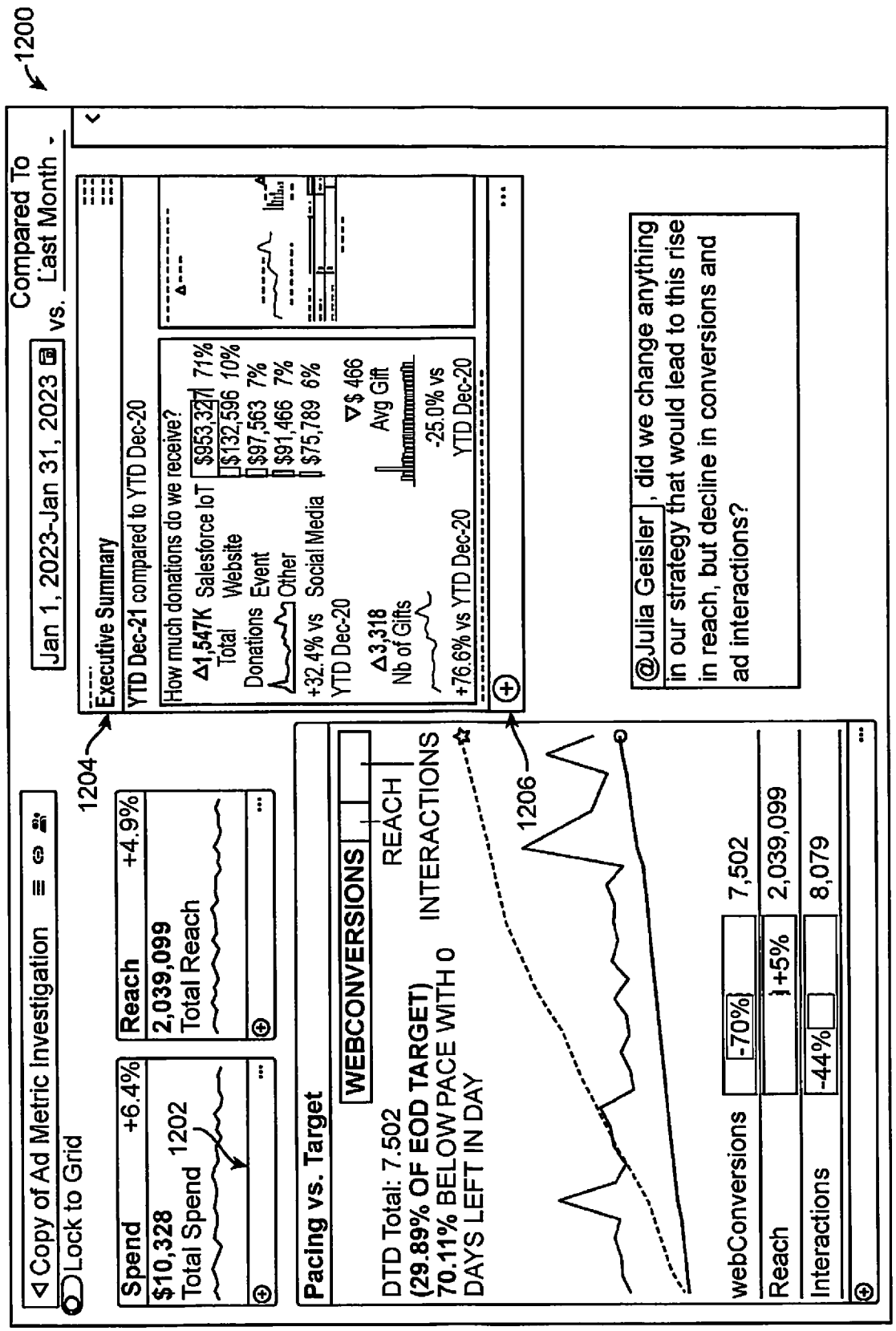
FIG. 13 is a screenshot showing an example of a collaboration portal user interface window according to an embodiment of the present disclosure.
Figure 14:
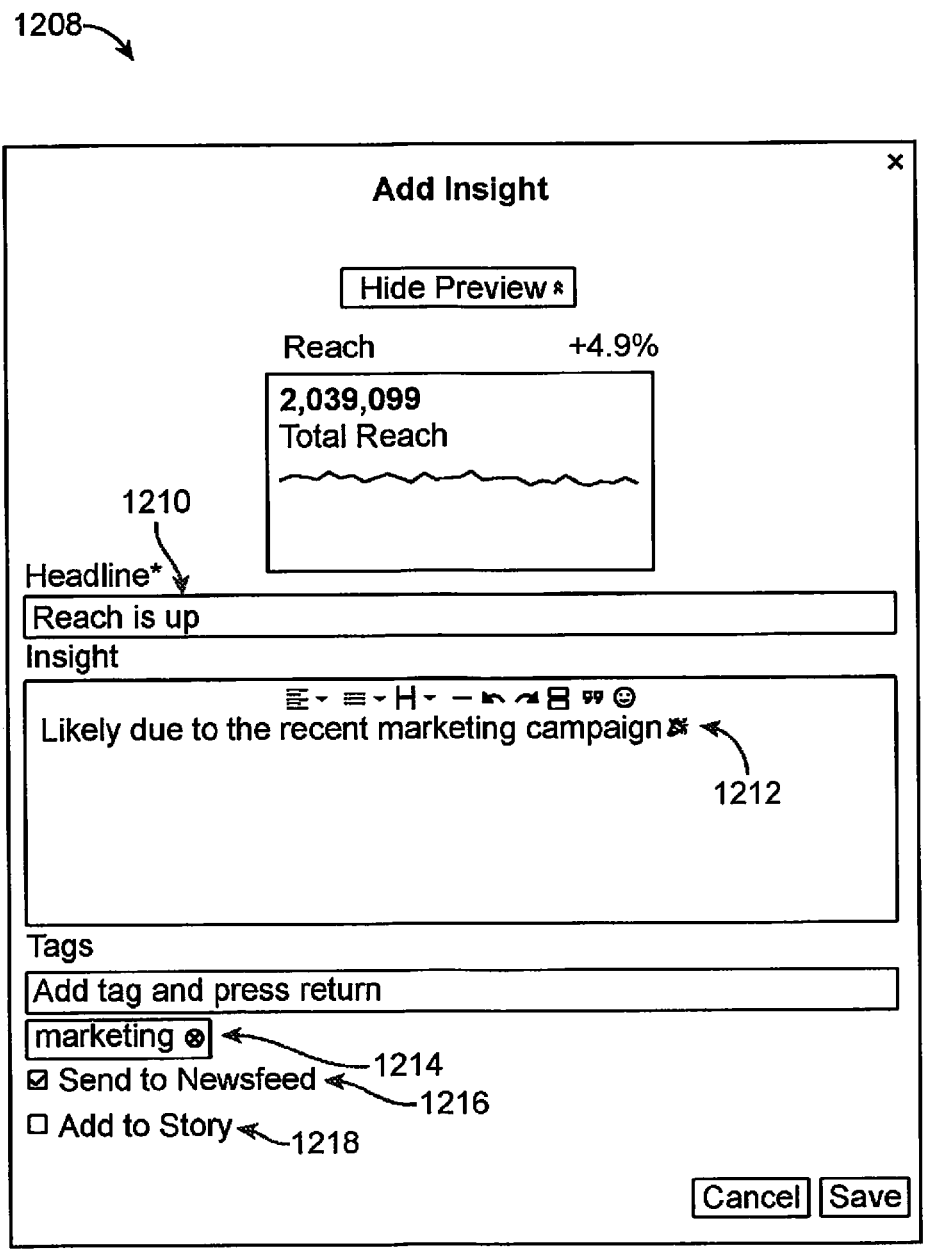
FIG. 14 is a screenshot showing an example of an add insight modal user interface window according to an embodiment of the present disclosure.

FIG. 14 illustrates an example of an add insight modal UI 1208, which is presented in response to selecting plus button 1206 in FIG. 13 to add an insight. For example, at 1210 the user can enter a headline (summary or takeaway for the insight). At 1212 the user can enter a description for the insight (such as additional detail/context to supplement the headline). The entered description can include embedded images in a further example. At 1214 the user can enter hashtags for use in searching/filtering, subscribing to, and personalizing insights. At 1216 the user can check the send to newsfeed option to publish this insight to the newsfeed as described above in 261. At 1218 the user can check the add to story option to add this insight to a new/existing story (see following the story framework 220).

Figure 15:
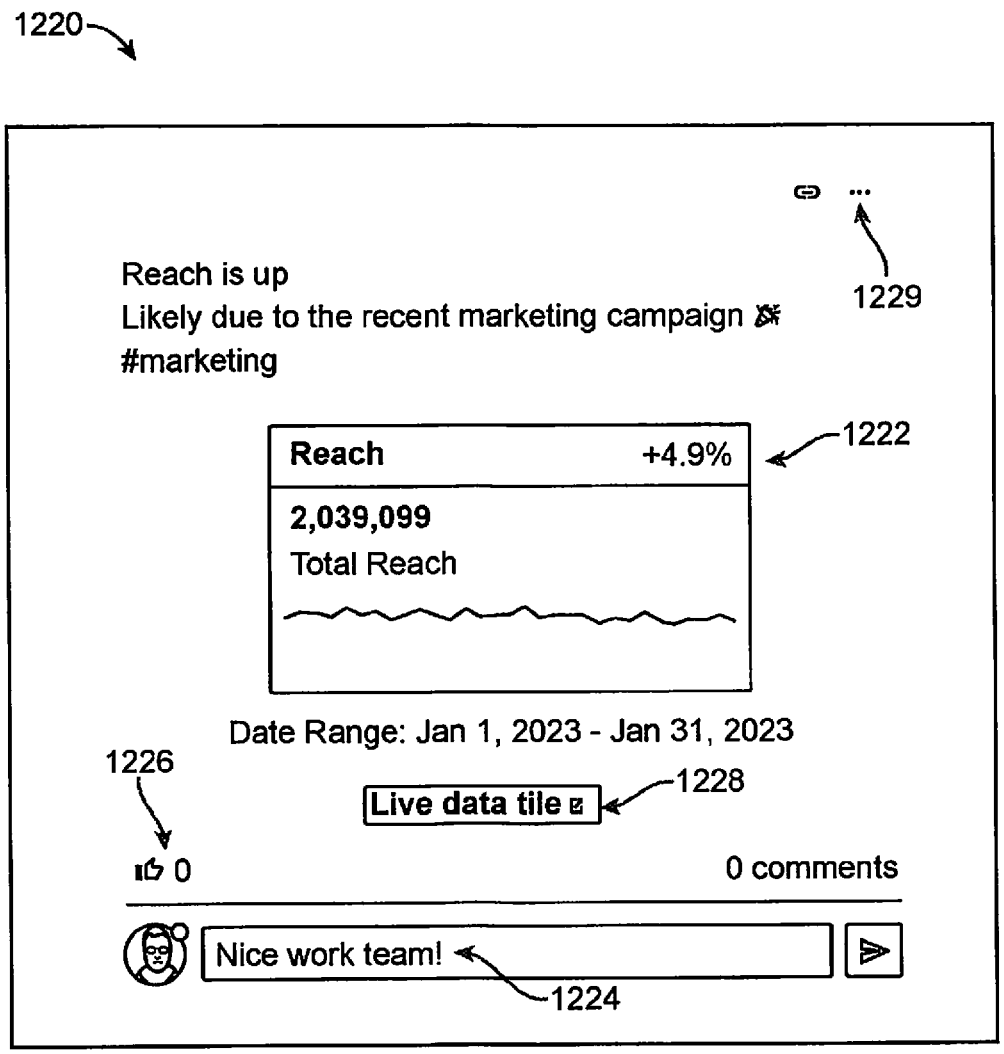
FIG. 15 is a screenshot showing an example of an insight on newsfeed user interface according to an embodiment of the present disclosure.

After sending an insight to the newsfeed as described above, all users can see this Insight appear on the Collaboration portal Newsfeed UI 1220 and interact with the Insight as shown in FIG. 15. For example, at 1222 users can see a snapshot of the data visualization associated with this Insight. At 1224 users can comment or ask questions about the Insight in threaded comments. At 1226 users can perform quick reactions on Insights (e.g., via a "like" button). At 1228 users can click a link to the live data tile (visualization) to navigate to the source from which this Insight was created. Further dropdown menus are provided at 1229 to allow a user who created the Insight to further edit the Insight.

As a further option, described above in connection with FIG. 10, users can create a "freeform" Insight as shown in FIG. 16 by uploading external files (PNG, PDF, PPT, XLS, etc.) via UI window or modals 1230 and 1231. For example, at 1232 a user can enter the source of the uploaded content. At 1234 the user can enter a URL to link to the source of the external content. At 1236 the user can upload an external file for hosting within Collaboration portal and to form the basis of subsequent Insights created off of this file. Optionally, modal 1231 may be presented to a user only after clicking "next" in modal 1230.

Figure 17:
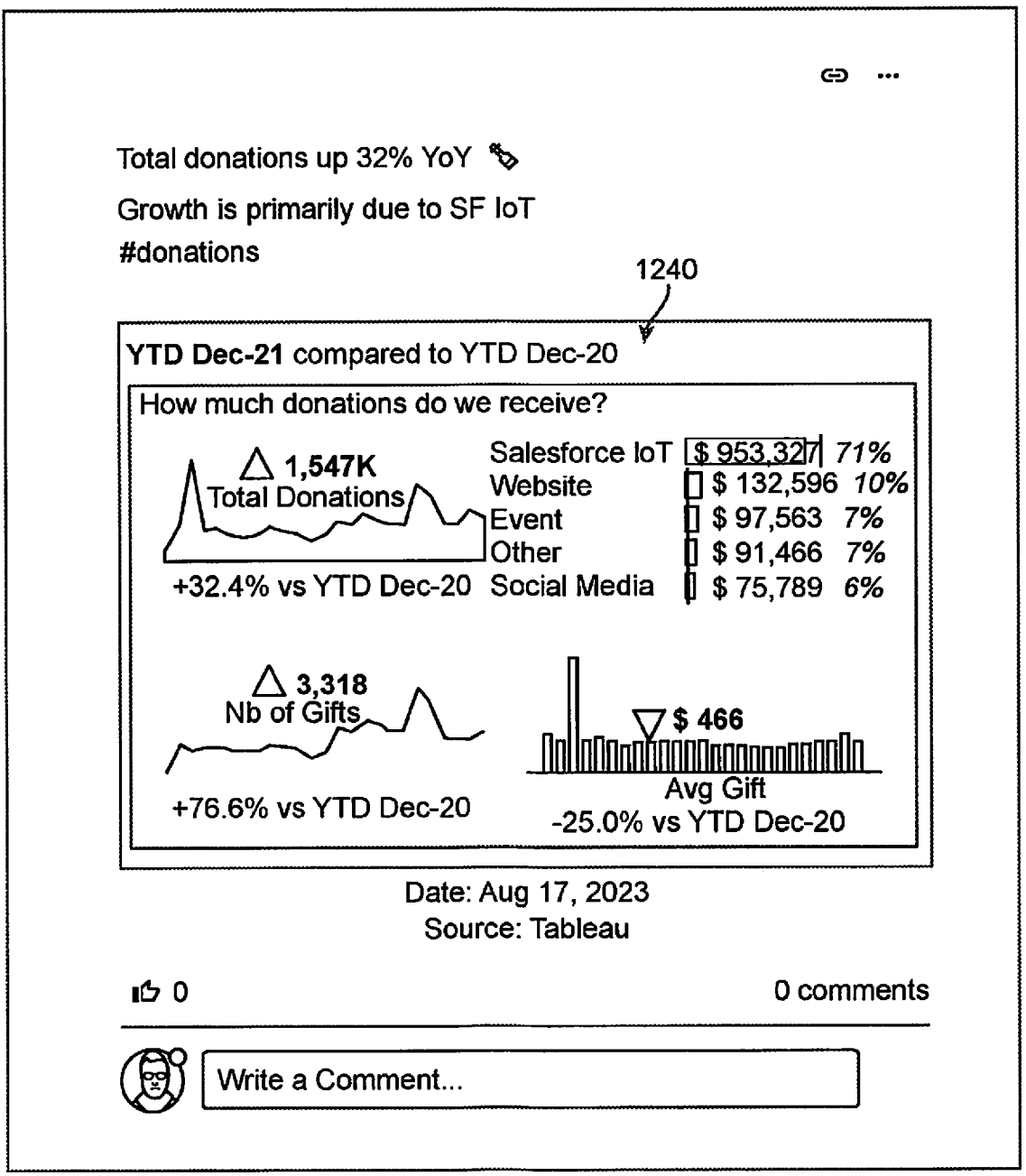
FIG. 17 is a screenshot showing an example of a user interface window showing a third-party Insight on a newsfeed according to an embodiment of the present disclosure.
Figure 18:
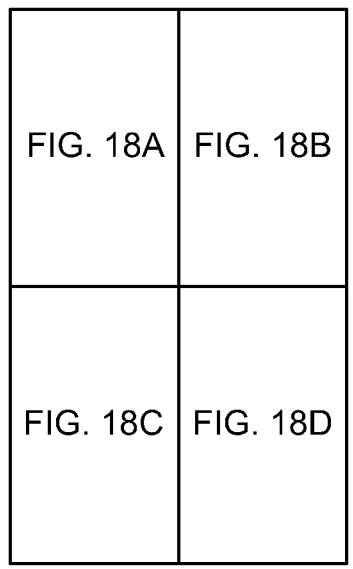
Figure 18C:
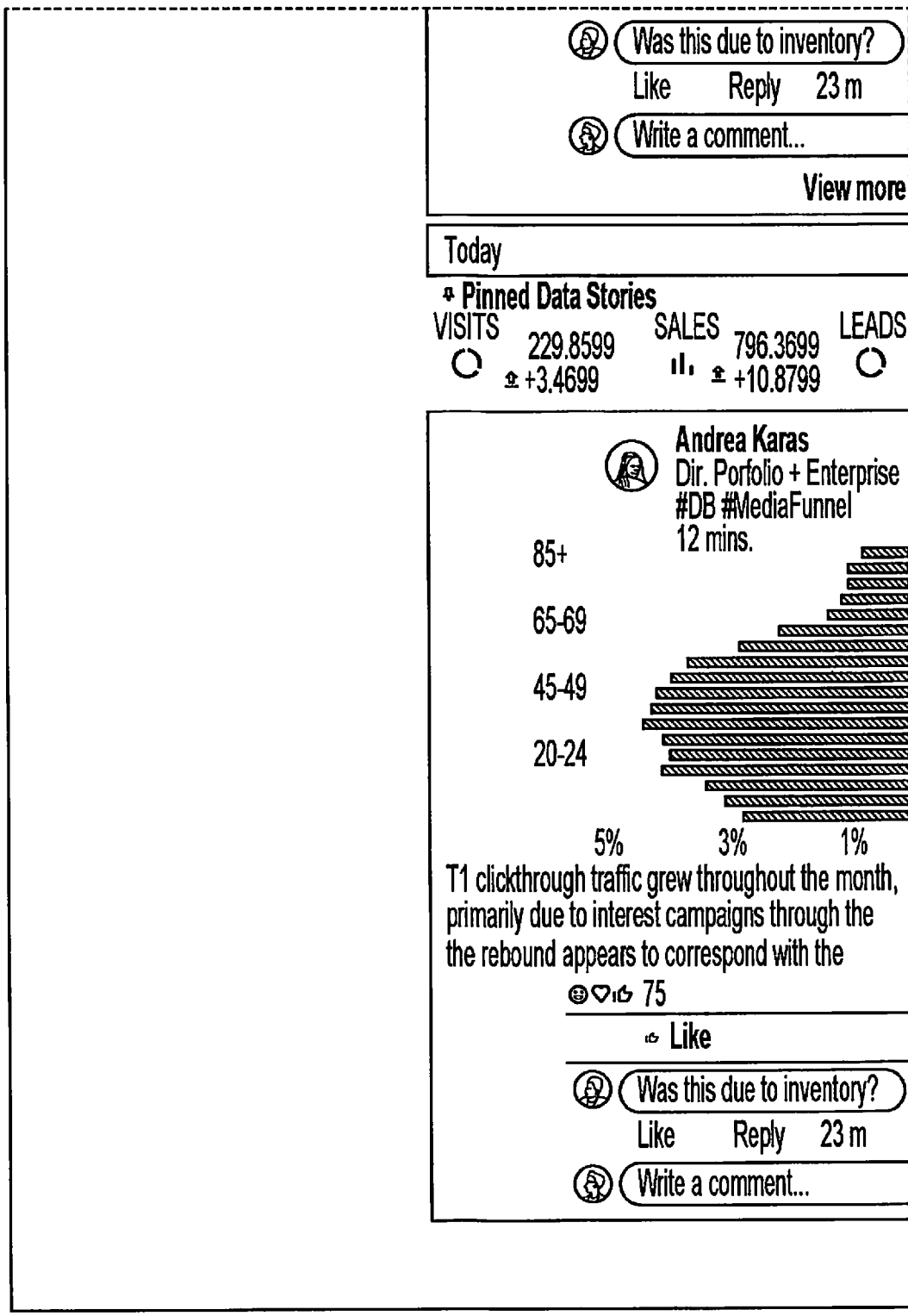
FIG. 18C shows the lower left portion of the user interface window and FIG. 18D shows the lower right portion of the user interface window.
Figure 18D:

FIG. 17 illustrates UI 1238 display of a third-party Insight on Newsfeed (see 263, FIG. 6). Within UI 1238, after creating an Insight from content generated within a third-party BI/DS tool (e.g., Tableau; see FIG. 4B and FIG. 5), all users can see this Insight 1240 on their Newsfeed for review and comment.

Collaboration portal Newsfeed 1242a/b is shown in FIGS. 18A-D and 19. As depicted therein, in this example, a complete Newsfeed view 1242a/b allows the user to scroll through all Insights and Stories posted to the Newsfeed, search and filter content, and interact with third-party integrations to enable easier communication with other users inside and outside of the Collaboration portal. For example, at 1244 the user can search and filter (via hashtags) newsfeed content, the user can pin content, the user can scroll through content in the live feed, which is ordered by an algorithm to personalize content for the user. At 1246 the user can discuss content with other users via third-party chat integrations (e.g., Slack). At 1248 the user can review additional content through RSS integrations (e.g., Google Alerts). At 1250 the user can discuss content with other users via third-party video conferencing integrations (e.g., Zoom). At 1252 the user can attach Insights to meetings, to provide attendees with relevant context, via integration with calendaring tools (e.g., Outlook).

Figure 20:
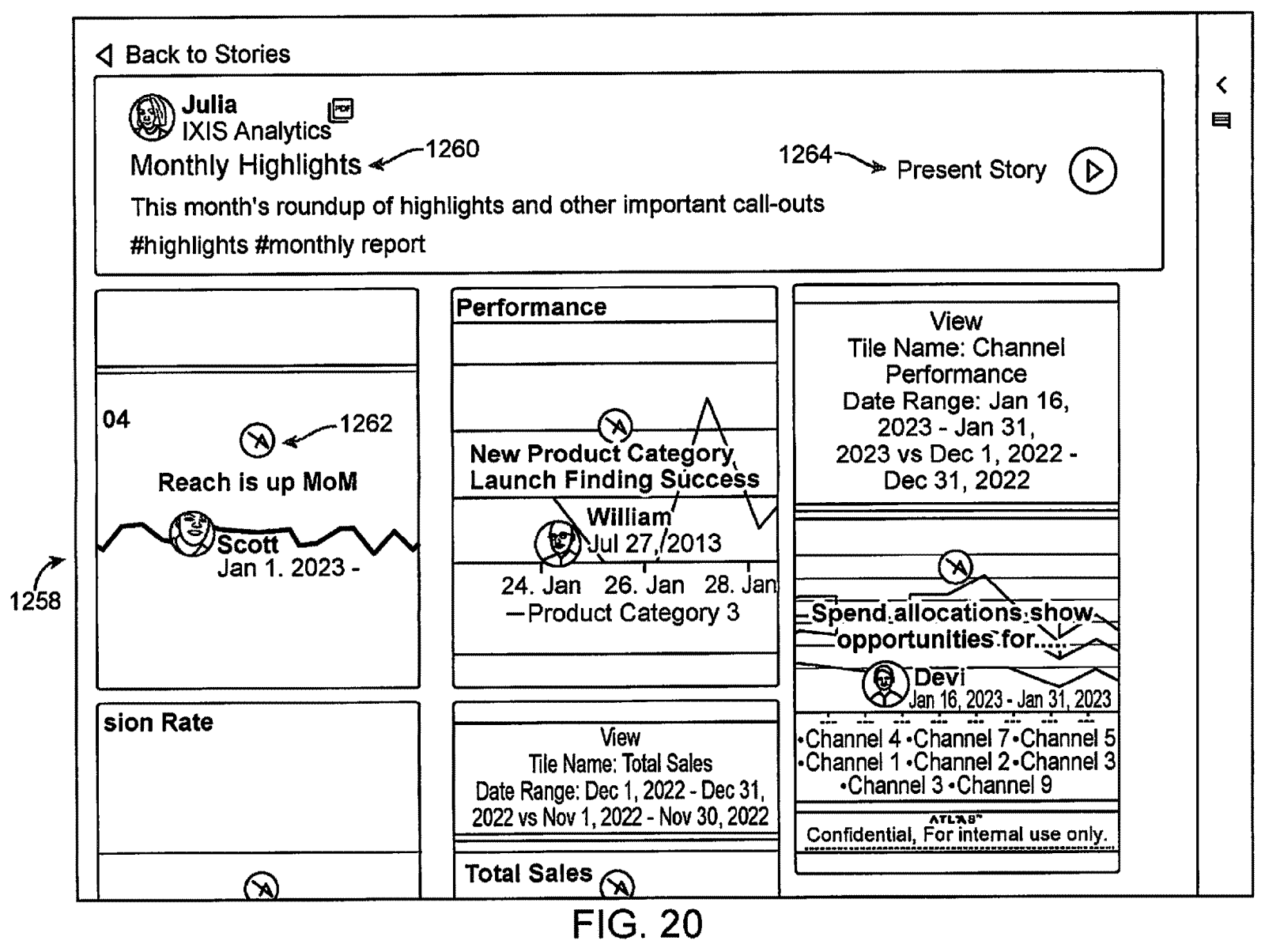

FIG. 20 illustrates UI 1258 for implementing a Story: Edit Mode. In this mode users can compile individual Insights into a Story to provide a more comprehensive update on an initiative. Insights can be pulled from any location within Collaboration portal (the Newsfeed, other Stories, etc.) and can include Insights created by other users. For example, at 1260 the user can set the title and summary for the Story. At 1262 the user can drag-and-drop Insight tiles into a Story from anywhere within Collaboration portal and arrange them into the sequence desired for presentation. At 1264 the user can click the play button to begin presentation mode for screensharing the Story.

Figure 21:
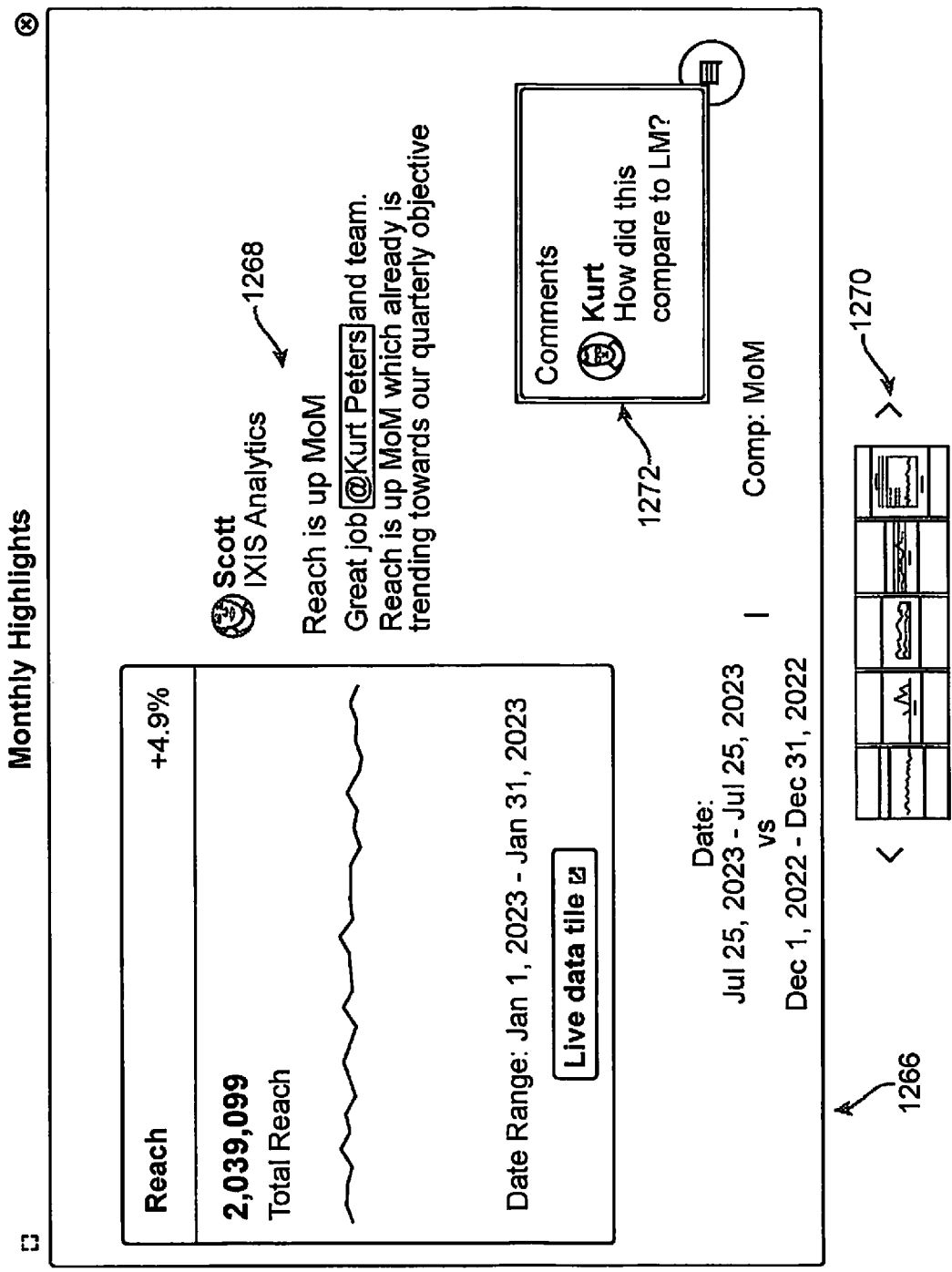
FIG. 21 is a screenshot showing an example of a story presentation mode user interface according to an embodiment of the present disclosure.

A Story: Presentation Mode UI 1266 is illustrated in FIG. 21. As shown therein, the presentation mode for a Story allows the user to easily narrate the collected Insights, e.g. during a screenshare. At 1268 the user can display each Insight in the Story sequence full-screen. At 1270 the user can use the carousel to navigate through the Insights comprising the Story.

Example Hardware Implementations

Figure 22:
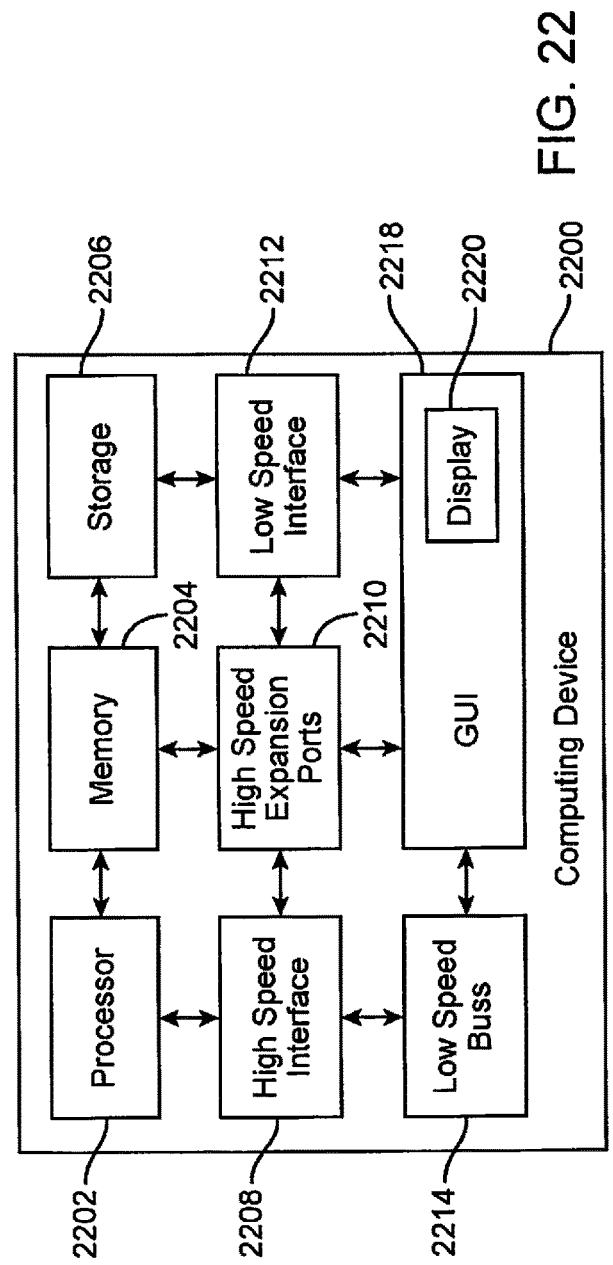
FIG. 22 is a block diagram of a computing device for implementation of embodiments disclosed herein.

In some embodiments, features or aspects of the present disclosure, such as but not limited to socialization platform 10, hardware/software systems 12, collaboration portal 17, and frameworks 18, etc., may be executed as one or more computing devices 2200 as illustrated in FIG. 22. In this example, computing device 2200 includes one or more processors 2202, memory 2204, storage device 2206, high-speed interface 2208 connecting to memory 2204 and high-speed expansion ports 2210, and a low speed interface 2212 connecting to low speed bus 2214 and storage device 2206. Each of the components 2202, 2204, 2206, 2208, 2210, and 2212, are interconnected using various busses or other suitable connections as indicated in FIG. 22 by arrows connecting components. The processor 2202 can process instructions for execution within the computing device 2200, including instructions stored in the memory 2204 or on the storage device 2206 to display graphical information via GUI 2218 with display 2220, or on an external user interface device, coupled to high speed interface 2208. In other implementations, multiple processors and/or multiple buses may be used, as appropriate, along with multiple memories and types of memory. Also, multiple computing devices 2200 may be connected, with each device providing portions of the necessary operations (e.g., as a server bank, a group of blade servers, or a multi-processor system).

Memory 2204 stores information within the computing device 2200. In one implementation, the memory 2204 is a computer-readable medium. In one implementation, the memory 2204 is a volatile memory unit or units. In another implementation, the memory 2204 is a non-volatile memory unit or units.

Storage device 2206 is capable of providing mass storage for the computing device 2200, and may be configured as data store 14 as described hereinabove. In one implementation, storage device 2206 is a computer-readable medium. In various different implementations, storage device 2206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2204, the storage device 2206, or memory on processor 2202.

High speed controller 2208 manages bandwidth-intensive operations for the computing device 2200, while low speed controller 2212 manages lower bandwidth-intensive operations. Such allocation of duties is exemplary only. In one implementation, high-speed controller 2208 is coupled to memory 2204, display 2220 (e.g., through a graphics processor or accelerator), and to high-speed expansion ports 2210, which may accept various expansion cards (not shown). In the implementation, low-speed controller 2212 is coupled to storage device 2206 and low-speed expansion port 2214. The low-speed expansion port, which may include various communication ports (e.g., USB, Bluetooth, Ethernet, wireless Ethernet) may be coupled to one or more input/output devices as part of GUI 2218 or as a further external user interface, such as a keyboard, a pointing device, a scanner, or a networking device such as a switch or router, e.g., through a network adapter.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., LED or LCD display monitor) for displaying information to the user and a keyboard and a pointing device (e.g., a mouse, trackball, or touch enabled display) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of wired or wireless digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Glossary of Selected Terms

While dictionary meanings are also implied by certain terms used herein, the following exemplary utilizations of certain terms may be useful:

Visualization or Data Visualization—a static or interactive visual representation of data that has been intentionally arranged or styled so as to communicate information about the system or process being measured by the displayed data, such as a trendline or bar chart. Depending on context, data visualizations include but are not limited to, graphs, charts and tables that organize and display data to the end user.

Insight: An image of the data visualization combined with the impression text, and defining attributes.

Story: A container object designed to associate one or more insights into a discussion with a standalone interpretation and additional context.

User: A human, or third-party system that is interacting with the user interface of the software.

Discussion: A conversation between two or more users centered on a specific topic, such as a Data Visualization or Insight.

Content of interest: Any visualization, insight, discussion or story of interest to a user or meeting assigned selection criteria.

Further features, benefits and aspects of embodiments disclosed herein include provision for capture and dissemination of one or more data visualization interpretations to multiple stakeholders. Disclosed embodiments provide an ability for the stakeholders to question and debate the interpretations and resulting conclusions. Once consensus is reached, the disclosed systems and methods memorialize the discussion and outcome for current or future stakeholders. Consensus outcomes can also be disseminated to other interested stakeholders for awareness or to avoid misunderstanding.

In another aspect, systems as described herein, including embodiments of socialization platforms, may be configured and hosted as a multi-tenant, SaaS (Software as a Service) solution in the cloud for consumption by one to many distinct customers.

In other aspects, disclosed platforms and systems may be deployed to a customer datacenter for their sole use.

In yet another aspect, platforms, systems and methods disclosed provide proprietary data visualizations and dashboards and then combine the proprietary visualization tools with third-party tools as sources for the insights.

As a further aspect of disclosed embodiments, platforms, systems and methods as disclosed may be implemented as web-based applications as well as native mobile applications that can provide access to the insights and collaboration functionality, and may further be configured as an add-on to an existing BI platform, either as an adjunct solution or embedded within the BI platform itself.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure or of the inventions as set forth in following claims.

What is claimed is:

1. A computer-implemented system, comprising one or more processors and non-transient data stores containing stored instructions configured to be executed by the one or more processors, wherein said instructions when executed by said one or more processors cause said processors to generate a business intelligence (BI) socialization platform, comprising:
    a user interface configured on a client system providing a collaboration portal;
    plural frameworks accessible by users through the collaboration portal, said frameworks configured to capture data visualizations from BI tools, generate insights based on the captured data visualizations, share generated insights among authorized stakeholders, and persist said generated insights for later reference by stakeholders within said platform; and
    integration of one or more BI tools such that outputs of said BI tools are accessible to users within said plural frameworks;
    wherein said stored instructions further cause said processors to:
    communicate across a computer-controlled network with one or more linked client systems and one or more BI tools;
    configure said one or more linked client systems as a platform user interface comprising a collaboration portal;
    integrate data visualization outputs of said one or more BI tools into said collaboration portal;
    configure an insight framework accessible by a client user through said collaboration portal to create insights, wherein the insight framework presents user manipulable virtual tools within the platform user interface on the client system, said tools configured to select, capture and annotate data visualization outputs of integrated BI tools as said insights and to persist said insights;
    display persisted insights to authorized stakeholders within said collaboration portal;
    configure a discussion framework accessible by a client user through said collaboration portal to create discussions; including share user-selected insights or stories, capture authorized stakeholder comments and responses to shared insights or stories, and persist created discussions;
    configure a newsfeed framework accessible by a client user through said collaboration portal, including identify discussions based on user-selected criteria and publish identified discussions to a newsfeed accessible by authorized stakeholders within the client system configured user interface;
    receive user-based selection criteria;
    filter the identified discussions based on the received selection criteria;
    weight the filtered discussions to create weighted discussions based on number of matching selection criteria;
    exclude any discussions without weighting; and
    display discussions within the collaboration portal in accordance with assigned weighting.

2. The system of claim 1, wherein persisted insights are sortable in accordance with user preference weighting for creation of stories aggregating contextually related insights.

3. The system of claim 1, wherein said plural frameworks comprise two or more of:
    an insight framework configured to capture data visualizations and annotate and tag said visualizations to create insights and to persist said insights;

a discussion framework configured to share insights with authorized stakeholders; capture comments and comment responses associated with shared insights to create discussions and persist said discussions;

a story framework configured to search for and associate context-related insights to create stories, further tag-created stories and persist stories as created; and a newsfeed framework configured to identify and sort insights, stories and discussion according to user prescribed preferences and disseminate said insights, stories and discussions to authorized stakeholders in accordance with said preferences.

4. The system of claim 1, wherein said selection criteria comprise tags added to discussions and said stored instructions further comprise instructions for:

querying the data store with the processor to identify sets of common tags added to discussions;

transmitting discussions corresponding to the common tag sets to the client system via the collaboration portal;

configuring the user interface on the client system to allow the user to select zero or more of identified tags;

transmitting tags selections to the processor; and persisting selections in the data store associated with user preferences.

5. The system of claim 1, wherein selection criteria comprise user-added comments and said stored instructions further comprise instructions for:

assigning user ID attributes to comments added to discussions to identify user source of comments;

comparing assigned user ID attributes to a logged-in user ID attribute; and assigning a non-zero weighting to comments with user ID attributes different than the logged-in user ID attribute.

6. The system of claim 5, wherein said instructions further comprise increasing weighting assigned to comments in reverse chronological order and adjusting said reverse chronological order weighting in each new user session.

7. The system of claim 1, wherein said selection criteria comprise historical interest weighting for a logged-in user and said stored instructions further comprise instructions for:

assigning user ID attributes to content of interest added to discussions to identify user source of content of interest;

identifying a discussion set comprising discussions with content of interest having user ID attributes corresponding to the logged-in user ID attribute;

identifying nouns contained within discussion titles of discussions in said identified discussion set;

identifying nouns contained within a new insight title; and assigning weighting to the new insight based on matching of identified nouns of the discussion set with identified nouns of the new insight.

8. The system of claim 1, wherein said selection criteria comprise creator identification and said stored instructions further comprises instructions for:

associating user ID attributes of creators of content of interest with the created content of interest;

creating a user-defined creator follow list;

searching content of interest for creator-user ID attributes corresponding to the user-defined creator follow list; and assigning increased weighting to content of interest based on number of matches to creator follow list.

9. The system of claim 1, wherein said selection criteria comprise tags added to content of interest and said stored instructions further comprise instructions for:

querying the data store with the processor to identify sets of common tags added to content of interest;

assigning weighting to the content of interest in proportion to increasing number of identified common tag sets; and persisting the content of interest with said assigned weighting.

10. The system of claim 1, wherein said instructions further comprise instructions for:

for each current logged-in system user, retrieving with the processor stored user weighting preferences;

determining with the processor weighting of newly stored discussions relative to user weighting preferences; and notifying specific logged-in users through the client system user interface of all non-zero weighted newly stored discussions.

11. The system of claim 10, wherein said instructions further comprise instructions for generating a user alert based on assigned relative weighting of newly stored discussions corresponding to specific logged-in users.

12. A computer-implemented method for business intelligence (BI) socialization, comprising:

configuring a collaboration portal on a client computing system including a user interface;

integrating into the collaboration portal on the client computing system a plurality of BI tools;

configuring within the collaboration portal on the client computing system a plurality of frameworks accessible by authenticated users of the client computing system, said frameworks configured to capture data visualizations from BI tools, generate insights based on the captured data visualizations, share generated insights among authorized stakeholders, and persist said generated insights for later reference by stakeholders within said platform;

communicating across a computer-controlled network with one or more configured client computer systems and one or more integrated BI tools;

presenting data visualization outputs of said one or more integrated BI tools into said collaboration portal;

configuring at least one said framework accessible by an authenticated user through said collaboration portal to create insights, wherein the insight framework presents user manipulable virtual tools within the platform user interface on the client system, said tools configured to select, capture and annotate data visualization outputs of integrated BI tools as said insights and to persist said insights;

displaying persisted insights to authorized stakeholders within said collaboration portal;

receiving at a remote system processor user-based selection criteria for one or more authenticated users;

filtering with the remote system processor persisted insights based on the received selection criteria;

weighting filtered insights with the remote system processor to create weighted insight sets corresponding to specific authenticated users based on number of matching selection criteria for each authenticated user;

excluding with the remote system processor any insights without weighting; and displaying insights within the collaboration portal for a specific authenticated user in accordance with weighting assigned by the remote system processor for the specific authenticated user.

13. The system of claim 12, wherein said filtering and weighting comprise:

assigning user ID attributes to comments added to discussions to identify user source of comments;

comparing assigned user ID attributes to a logged-in user ID attribute; and assigning a non-zero weighting to comments with user ID attributes different than the logged-in user ID attribute.

14. The system of claim 13, wherein said weighting further comprises increasing weighting assigned to comments in reverse chronological order and adjusting said reverse chronological order weighting in each new user session.

15. The system of claim 12, wherein said filtering and weighing comprise:

assigning user ID attributes to content of interest added to discussions to identify user source of content of interest;

identifying a discussion set comprising discussions with content of interest having user ID attributes corresponding to the logged in user ID attribute;

identifying nouns contained within discussion titles of discussions in said identified discussion set;

identifying nouns contained within a new insight title; and assigning weighting to the new insight based on matching of identified nouns of the discussion set with identified nouns of the new insight.

16. The system of claim 12, wherein said filtering and weighting comprise:

associating user ID attributes of creators of content of interest with the created content of interest;

creating a user-defined creator follow list;

searching content of interest for creator user ID attributes corresponding to the user-defined creator follow list; and assigning increased weighting to content of interest based on number of matches to creator follow list.

17. The system of claim 12, wherein said filtering and weighting comprise:

querying the data store with the processor to identify sets of common tags added to content of interest;

assigning weighting to the content of interest in proportion to increasing number of identified common tag sets; and persisting the content of interest with said assigned weighting.

18. The system of claim 12, wherein said filtering and weighting comprise:

for each current logged-in system user, retrieving with the processor stored user weighting preferences;

determining with the processor weighting of newly stored discussions relative to user weighting preferences; and notifying specific logged-in users through the client system user interface of all non-zero weighted newly stored discussions.

19. The system of claim 18, wherein notifying further comprises generating a user alert based on assigned relative weighting of newly stored discussions corresponding to specific logged-in users.

20. The method of claim 12, wherein said plural frameworks comprise two or more of an insight framework configured to capture data visualizations and annotate and tag said visualizations to create insights and to persist said insights;

a discussion framework configured to share insights with authorized stakeholders; capture comments and comment responses associated with shared insights to create discussions and persist said discussions;

a story framework configured to search for and associate context-related insights to create stories, further tag-created stories and persist stories as created; and a newsfeed framework configured to identify and sort insights, stories and discussion according to user-prescribed preferences and disseminate said insights, stories and discussions to authorized stakeholders in accordance with said preferences.

21. The method of claim 20, further comprising configuring the insight framework accessible by an authenticated user within the collaboration portal on the client computing system to create insights, wherein said configuring the insight framework comprises presenting user manipulable virtual tools within the collaboration platform user interface on the client computing system, said tools configured to select, capture and annotate data visualization outputs of integrated BI tools as said insights and to persist said insights.

22. The method of claim 20, further comprising configuring the story framework accessible by an authenticated user within the collaboration portal on the client computing system to create stories, wherein said configuring the story framework comprises:

configuring a search dialogue within the user interface, searching persisted insights for contextual relationships based on user-entered context terms;

creating stories by associating retrieved contextually related insights; and persisting created stories to a data store.

23. The method of claim 20, further comprising configuring the discussion framework accessible by an authenticated user within the collaboration portal on the client computing system to create discussions, wherein said configuring the discussion framework comprises:

sharing user-selected insights or stories;

capturing authorized stakeholder comments and responses to shared insights or stories; and persisting created discussions to a data store.

24. The method of claim 20, further comprising configuring the newsfeed framework accessible by an authenticated user within the collaboration portal on the client computing system to create a newsfeed, wherein said configuring the newsfeed framework comprises:

identifying discussions based on user-selected criteria; and publishing identified discussions to a newsfeed accessible by authorized stakeholders within one said client computing system configured user interface.

25. A non-transitory computer readable medium containing instructions to cause one or more processing systems to:

configure a collaboration portal on a client computing system including a user interface;

integrating into the collaboration portal on the client computing system a plurality of BI tools;

configure within the collaboration portal on the client computing system a plurality of frameworks accessible by authenticated users of the client computing system, said frameworks configured to capture data visualizations from BI tools, generate insights based on the captured data visualizations, share generated insights among authorized stakeholders, and persist said generated insights for later reference by stakeholders within said platform;

communicate across a computer-controlled network with one or more configured client computer systems and one or more integrated BI tools;

present data visualization outputs of said one or more integrated BI tools into said collaboration portal;

configure at least one said framework accessible by an authenticated user through said collaboration portal to create insights, wherein the insight framework presents user manipulable virtual tools within the platform user interface on the client system, said tools configured to select, capture and annotate data visualization outputs of integrated BI tools as said insights and to persist said insights;

display persisted insights to authorized stakeholders within said collaboration portal;

receive at a remote system processor user-based selection criteria for one or more authenticated users;

filter with the remote system processor persisted insights based on the received selection criteria;

weight filtered insights with the remote system processor to create weighted insight sets corresponding to specific authenticated users based on number of matching selection criteria for each authenticated user;

exclude with the remote system processor any insights without weighting; and display insights within the collaboration portal for a specific authenticated user in accordance with weighting assigned by the remote system processor for the specific authenticated user.

* * * * *